US010871920B2

(12) United States Patent
Yoshii et al.

(10) Patent No.: US 10,871,920 B2
(45) Date of Patent: Dec. 22, 2020

(54) STORAGE DEVICE AND COMPUTER SYSTEM

(71) Applicant: Toshiba Memory Corporation, Minato-ku (JP)

(72) Inventors: Kenichiro Yoshii, Bunkyo (JP); Daisuke Iwai, Yokohama (JP); Tetsuya Sunata, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 152 days.

(21) Appl. No.: 16/047,205

(22) Filed: Jul. 27, 2018

(65) Prior Publication Data
US 2019/0294365 A1 Sep. 26, 2019

(30) Foreign Application Priority Data

Mar. 22, 2018 (JP) ................................. 2018-054918

(51) Int. Cl.
*G06F 3/06* (2006.01)
*G06F 12/02* (2006.01)

(52) U.S. Cl.
CPC ............ *G06F 3/0659* (2013.01); *G06F 3/064* (2013.01); *G06F 3/0613* (2013.01); *G06F 3/0647* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| 9,733,857 | B2 | 8/2017 | Yang et al. | |
|---|---|---|---|---|
| 2006/0031691 | A1* | 2/2006 | Bacchus | G06F 1/3228 713/300 |
| 2007/0211530 | A1 | 9/2007 | Nakano | |
| 2008/0215800 | A1* | 9/2008 | Lee | G06F 3/0688 711/103 |
| 2008/0222348 | A1* | 9/2008 | Mosek | G06F 16/10 711/103 |
| 2008/0244164 | A1* | 10/2008 | Chang | G06F 12/0246 711/103 |
| 2009/0006725 | A1 | 1/2009 | Ito et al. | |
| 2012/0030413 | A1 | 2/2012 | Miyagawa et al. | |
| 2012/0254574 | A1 | 10/2012 | Sinclair et al. | |
| 2015/0324119 | A1* | 11/2015 | Romanovsky | G06F 12/08 711/103 |

(Continued)

FOREIGN PATENT DOCUMENTS

| JP | 2007-242163 | 9/2007 |
|---|---|---|
| KR | 10-2008-0055734 A | 6/2008 |

(Continued)

*Primary Examiner* — Kaushikkumar M Patel
(74) *Attorney, Agent, or Firm* — Oblon, McClelland, Maier & Neustadt, L.L.P.

(57) ABSTRACT

According to one embodiment, a storage device includes a nonvolatile memory including a plurality of blocks, and a controller. The controller receives from the host information indicative of the total number of processes running on the host. The controller executes processing of moving data stored in at least one block of the nonvolatile memory to at least one block of the other blocks of the nonvolatile memory, after determining that the total number of processes exceeds a first threshold value.

15 Claims, 19 Drawing Sheets

(56) References Cited

U.S. PATENT DOCUMENTS

| | | | |
|---|---|---|---|
| 2016/0098213 A1* | 4/2016 | Franceschini | G06F 3/064 |
| | | | 711/103 |
| 2016/0266792 A1* | 9/2016 | Amaki | G06F 12/0246 |
| 2016/0283125 A1* | 9/2016 | Hashimoto | G06F 16/166 |
| 2017/0017406 A1* | 1/2017 | Dubeyko | G06F 3/0652 |
| 2017/0212678 A1* | 7/2017 | Blount | G06F 3/061 |
| 2017/0220292 A1* | 8/2017 | Hashimoto | G06F 3/0679 |
| 2017/0242790 A1* | 8/2017 | O'Krafka | G06F 3/0604 |
| 2017/0249092 A1* | 8/2017 | Konosu | G06F 12/00 |
| 2018/0032275 A1 | 2/2018 | Pahwa et al. | |
| 2018/0373636 A1 | 12/2018 | Roh et al. | |
| 2020/0004671 A1* | 1/2020 | Neufeld | G11C 16/10 |

FOREIGN PATENT DOCUMENTS

| | | |
|---|---|---|
| KR | 10-2012-0012375 A | 2/2012 |
| KR | 10-2014-0043329 A | 4/2014 |
| KR | 10-2017-0072600 A | 6/2017 |

\* cited by examiner

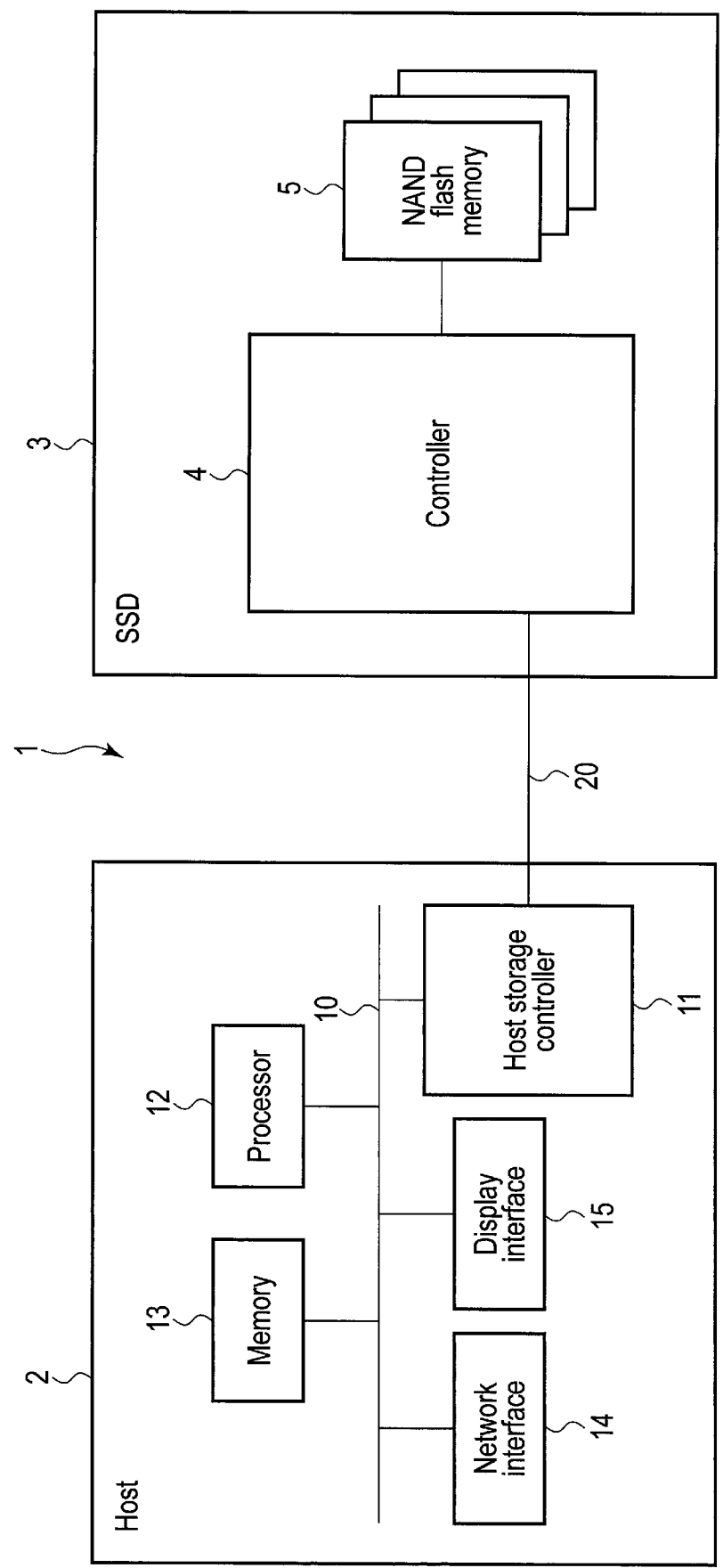
F I G. 1

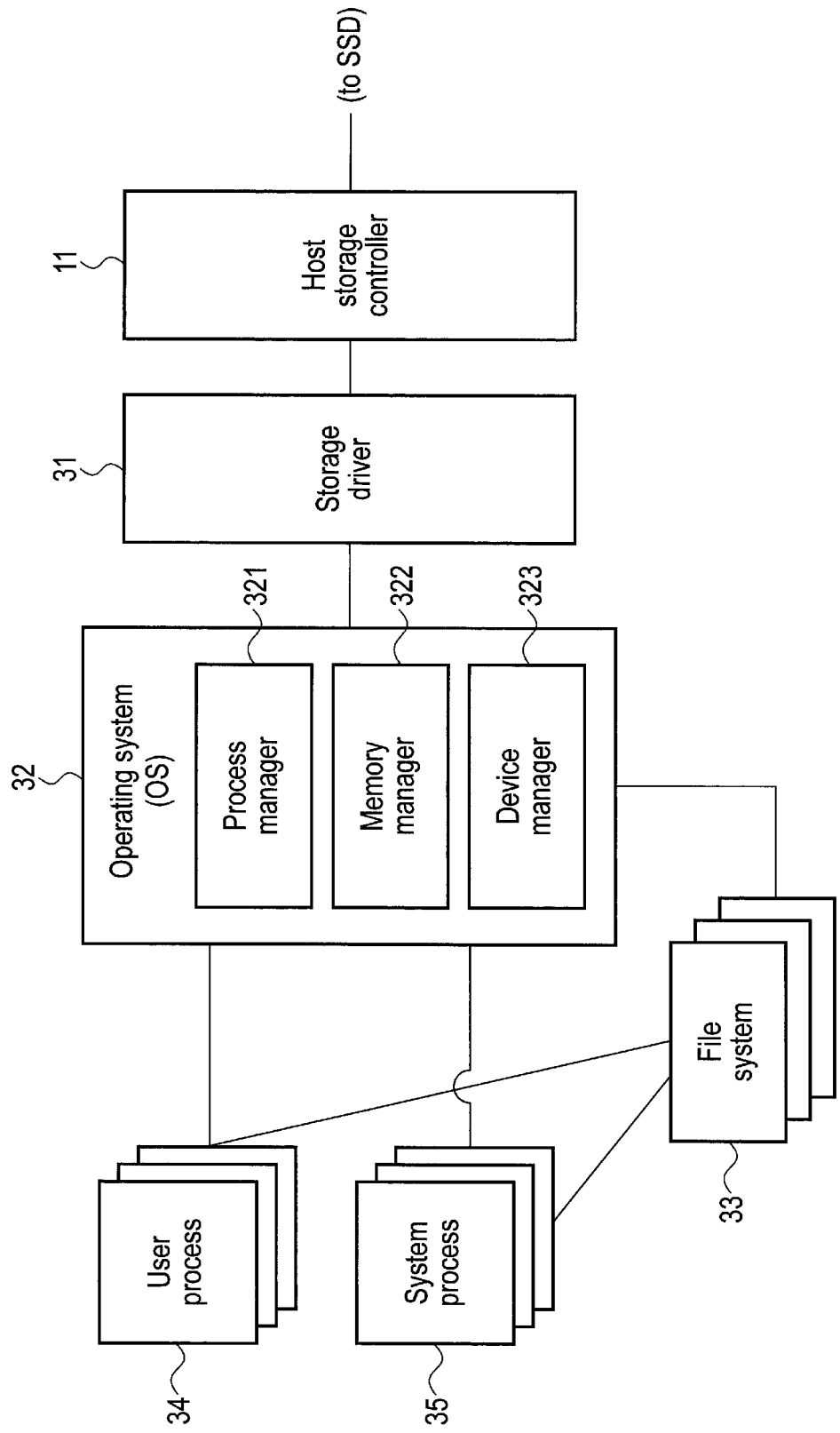
F I G. 2

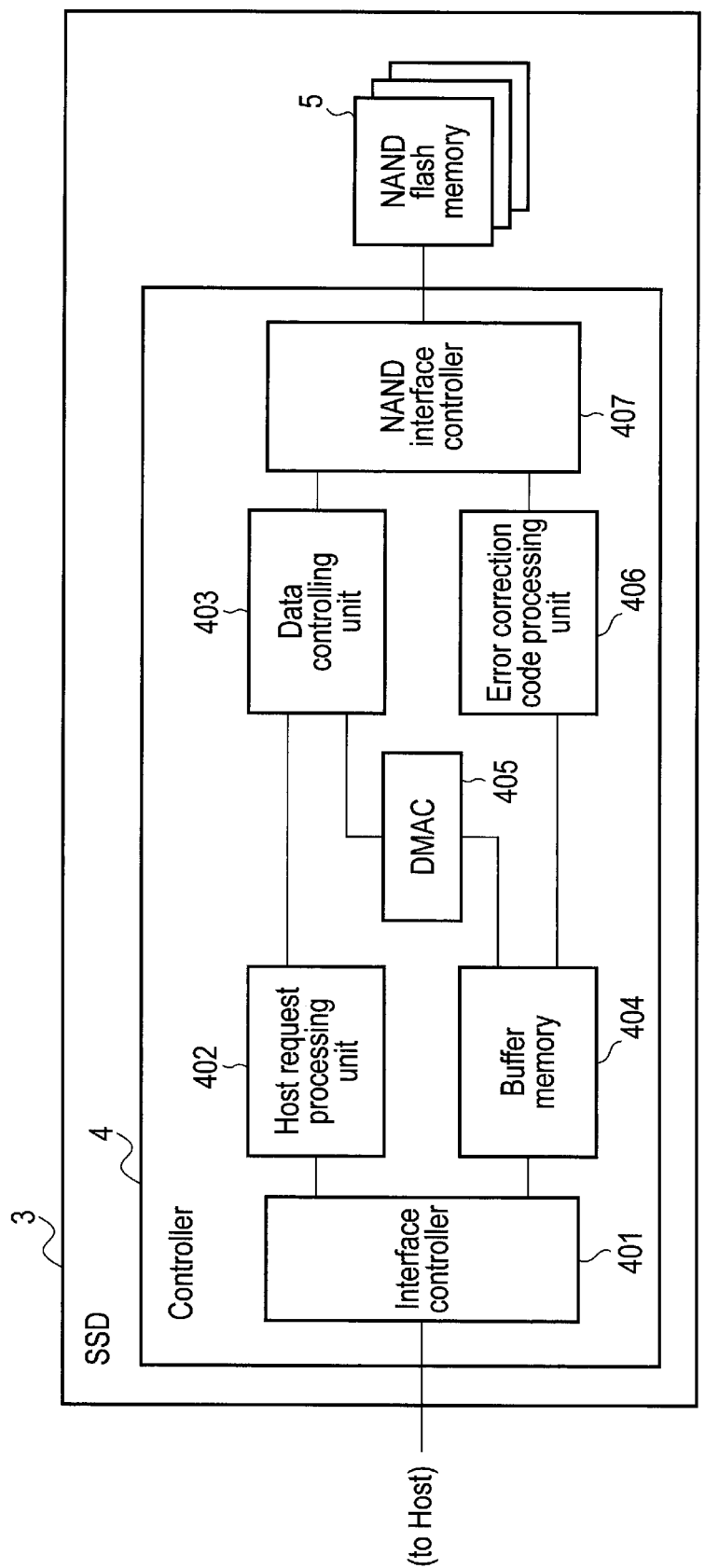
F I G. 3

|  | Use block count | Valid data amount | Maximum block count | Maximum data amount | Free block count |
|---|---|---|---|---|---|
| SLC |  |  |  |  |  |
| MLC |  |  |  |  |  |
| TLC |  |  |  |  |  |
| Whole SSD |  |  |  |  |  |

F I G. 5

| Process identifier | Process type | Memory usage | LBA use list | Latest launch time |
|---|---|---|---|---|
|  |  |  |  |  |
|  |  |  | ⋮ |  |
|  |  |  |  |  |
|  |  |  | ⋮ |  |
| ⋮ | ⋮ | ⋮ | ⋮ | ⋮ |

F I G. 7

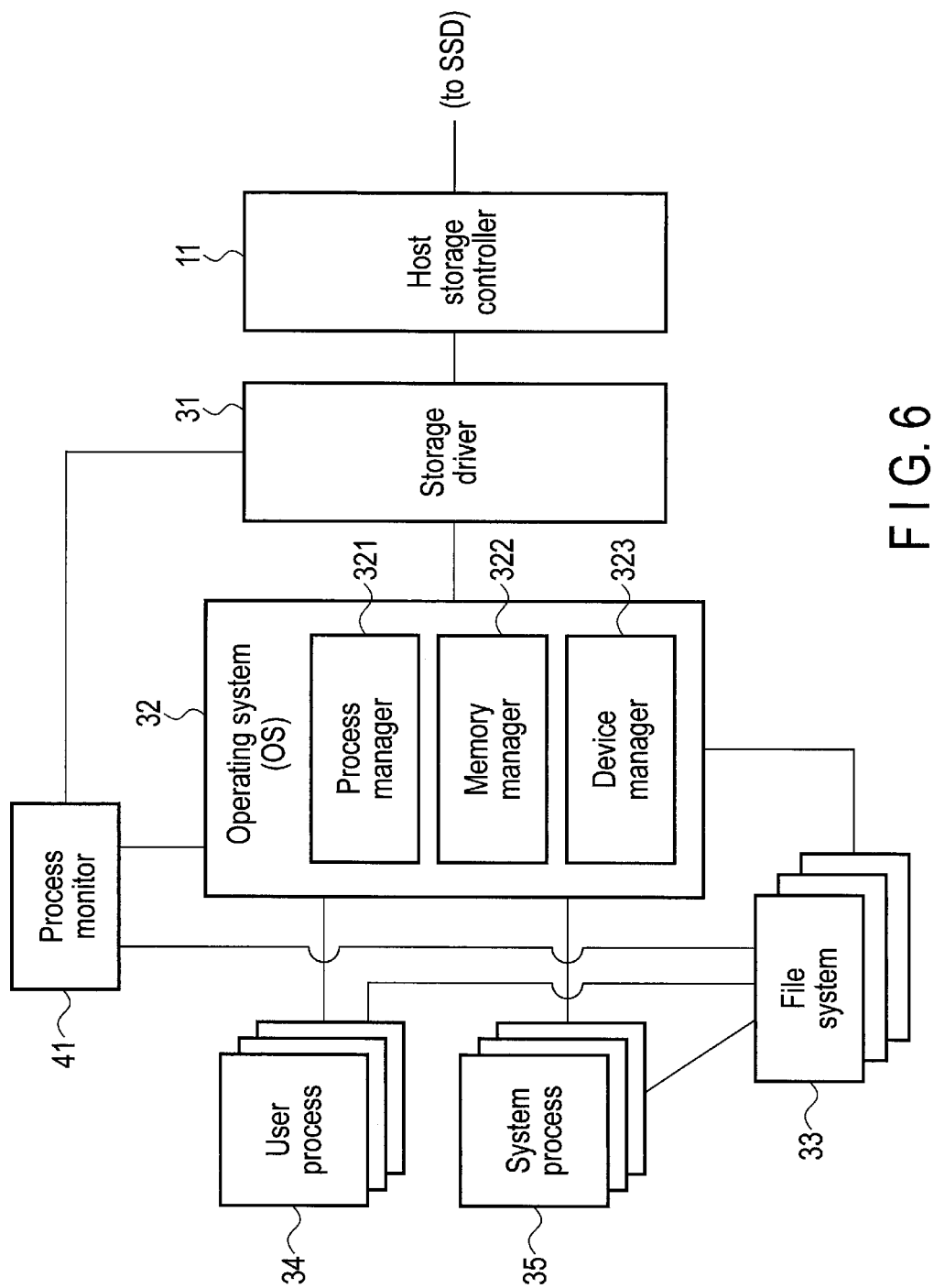
F I G. 6

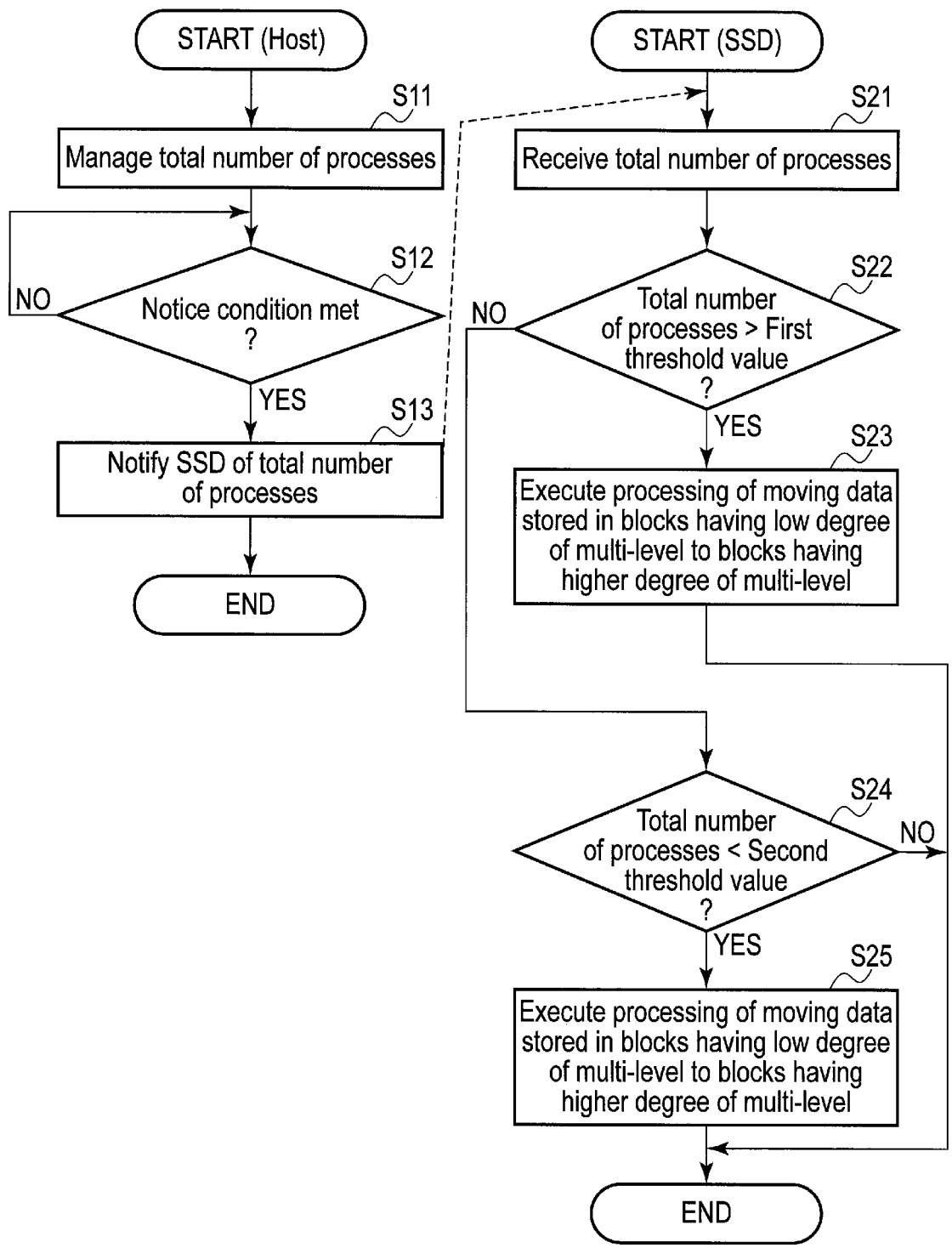
F I G. 8

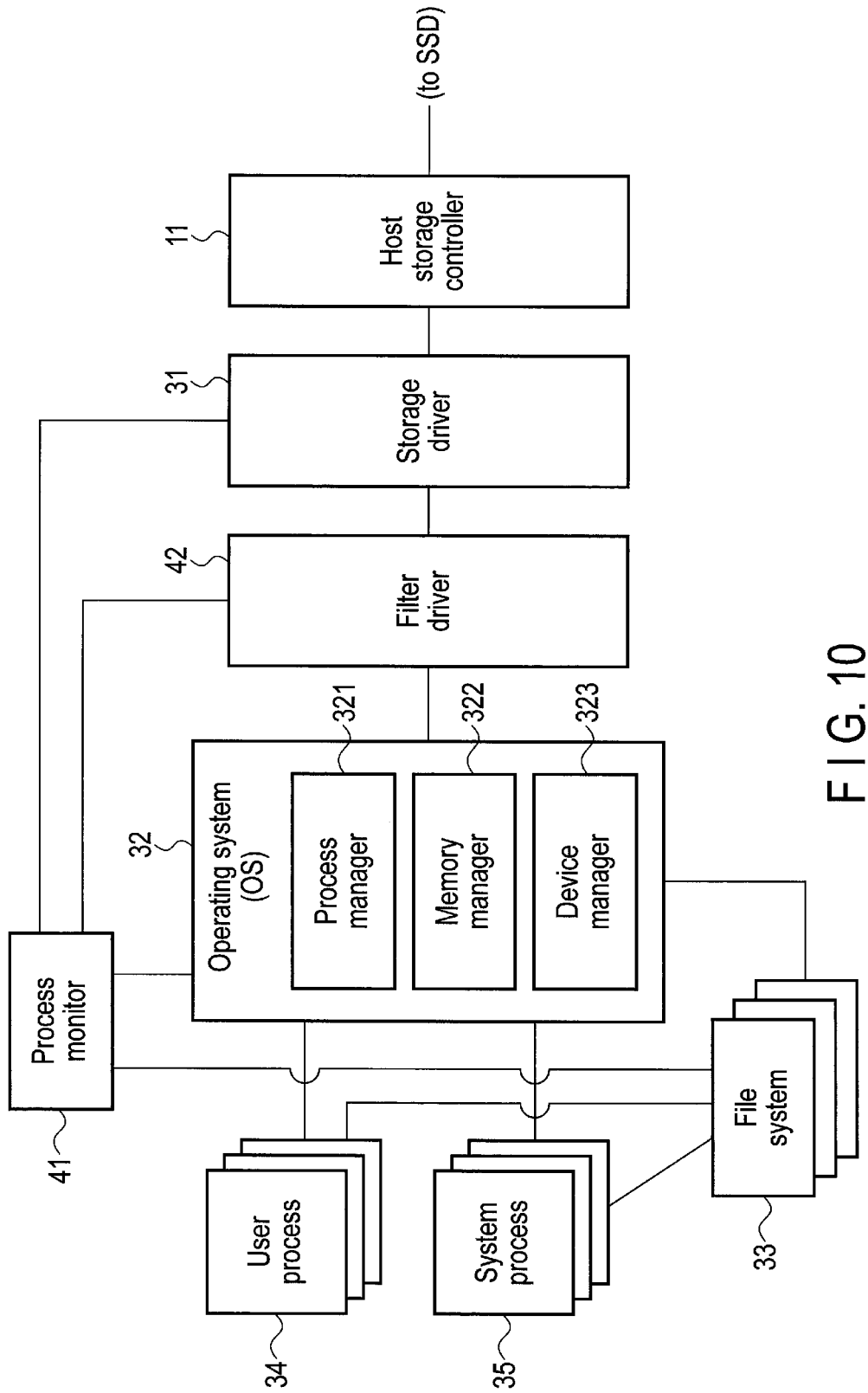
F I G. 10

| Process identifier | SLC (data amount) | MLC (data amount) | TLC (data amount) | Process type | LBA region/degree of multi-level | Latest access time |
|---|---|---|---|---|---|---|
| | | | | | | |
| | | | | | | |
| ... | ... | ... | ... | ... | ... | ... |

FIG. 11

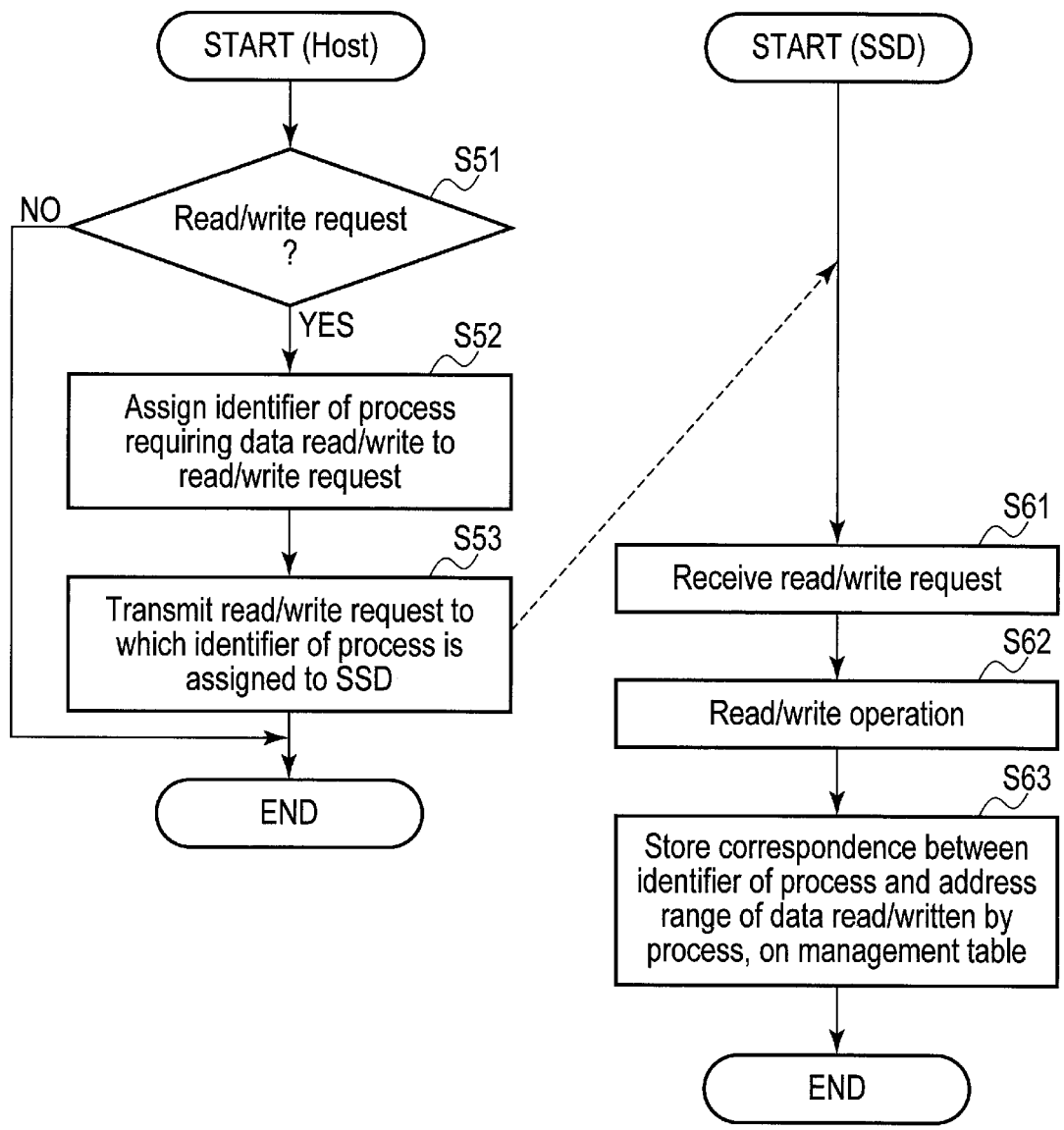
F I G. 12

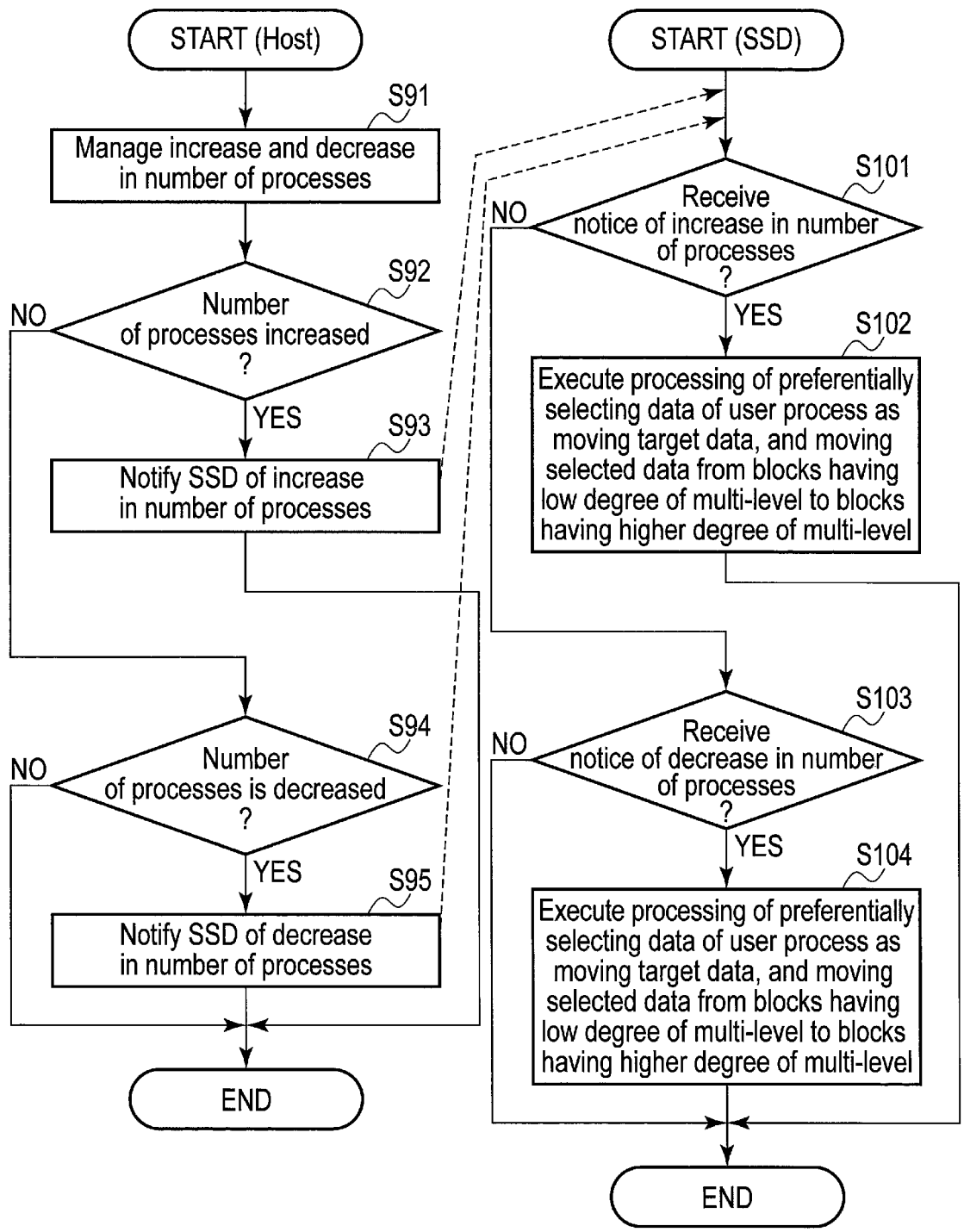
F I G. 16

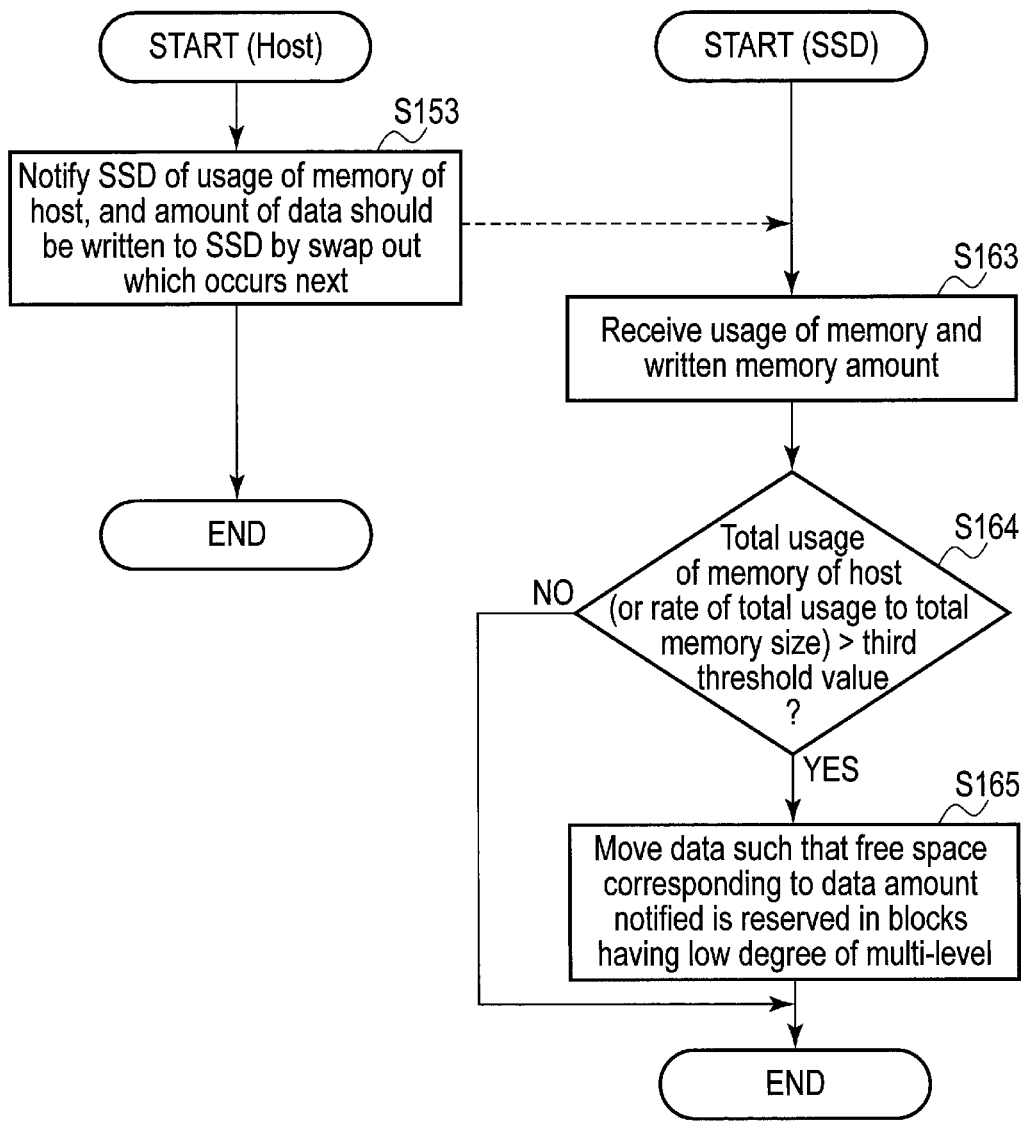
F I G. 21

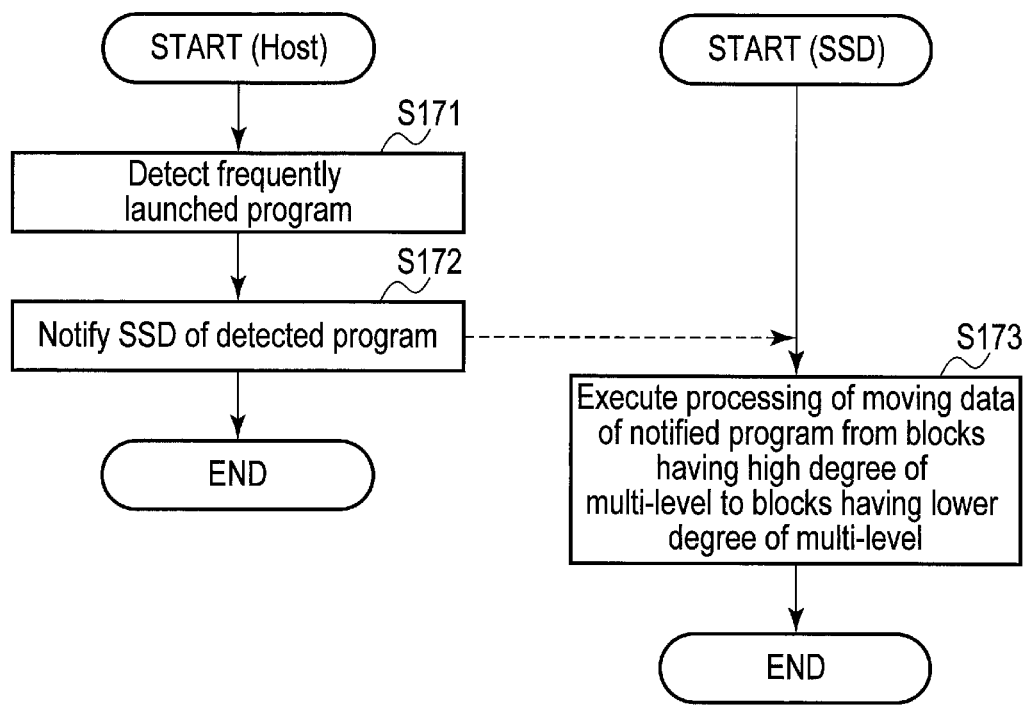
F I G. 22

STORAGE DEVICE AND COMPUTER SYSTEM

CROSS-REFERENCE TO RELATED APPLICATIONS

This application is based upon and claims the benefit of priority from Japanese Patent Application No. 2018-054918, filed Mar. 22, 2018, the entire contents of which are incorporated herein by reference.

FIELD

Embodiments described herein relate generally to a technology of controlling a nonvolatile memory.

BACKGROUND

A computer system represented by a personal computer is composed of a host (host computer) which executes processing desired for the user, a storage device which stores an operation result and data, and the like.

Storage devices equipped with nonvolatile memories have been widely prevalent as the storage device. As one of the storage devices, a solid state drive (SSD) provided with a NAND flash memory is known.

Recently, enhancement of the performance of the storage device has been required to attempt improvement of the performance of the computer system.

BRIEF DESCRIPTION OF THE DRAWINGS

FIG. 1 is a block diagram showing a configuration example of a computer system comprising a storage device according to first embodiment.

FIG. 2 is a block diagram showing an inner configuration example of a host (host computer).

FIG. 3 is a block diagram showing a configuration example of the storage device according to the first embodiment.

FIG. 5 is a table for management of a state of use of the nonvolatile memory, which is used by the storage device of the first embodiment.

FIG. 6 is a block diagram showing an inner configuration example of the host including a process monitor.

FIG. 7 is a table showing an example of a management table used by the process monitor of the host.

FIG. 8 is a flowchart showing a procedure of total process number notice processing and data move processing, which are executed by the host and the storage device of the first embodiment.

FIG. 10 is a block diagram showing an inner configuration example of the host corresponding to a storage device of second embodiment.

FIG. 11 is a table showing an example of a management table created by the storage device of the second embodiment.

FIG. 12 is a flowchart showing a procedure of data read/write processing executed by a host and the memory system of the second embodiment.

FIG. 16 is a flowchart showing a procedure of process number increase/decrease notice processing and data move processing, which are executed by the host and the storage device of third embodiment.

FIG. 21 is a flowchart showing a procedure of processing for notifying memory usage or a data amount written to a storage device by swap out and data move processing, which are executed by the host and a storage device of the fifth embodiment.

FIG. 22 is a flowchart showing a procedure of processing for notifying a program frequently launched and data move processing, which are executed by a host and a storage device of sixth embodiment.

DETAILED DESCRIPTION

Figure 4:
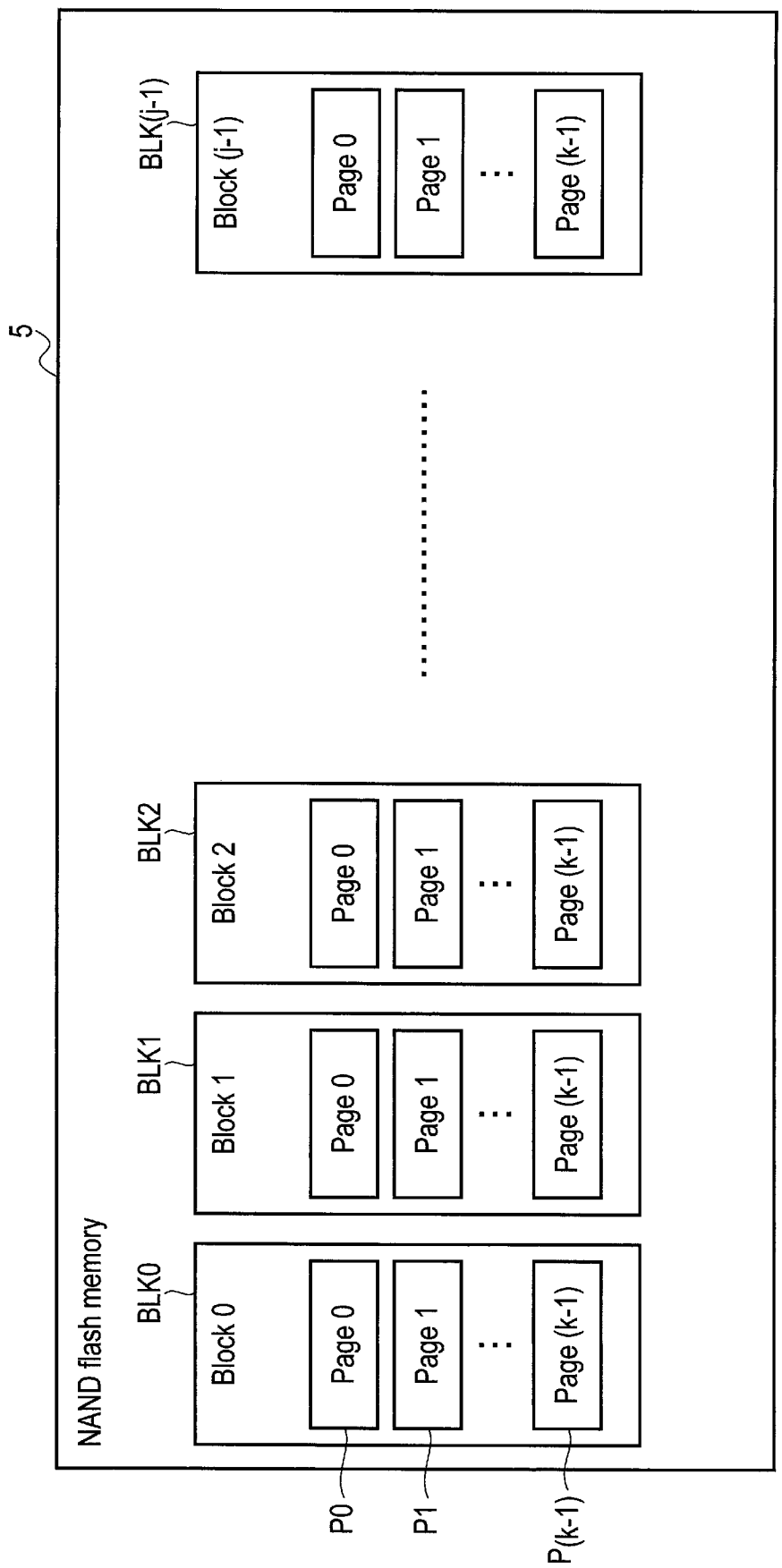
FIG. 4 is a diagram showing a configuration example of a nonvolatile memory provided in the storage device of the first embodiment.

Various embodiments will be described hereinafter with reference to the accompanying drawings.

In general, according to one embodiment, a storage device connectable to a host, comprises a nonvolatile memory including a plurality of blocks, and a controller electrically connected to the nonvolatile memory and configured to control the nonvolatile memory. The controller receives from the host information indicative of the total number of processes running on the host. The controller executes processing of moving data stored in at least one block of the nonvolatile memory to at least one block of the other blocks of the nonvolatile memory, after determining that the total number of processes exceeds a first threshold value.

First Embodiment

<Explanation of Computer System>

First, a configuration of a computer system 1 including a storage system according to first embodiment will be explained with respect to FIG. 1.

The storage device is a semiconductor storage device configured to write data to a nonvolatile memory and to read data from the nonvolatile memory. The storage device is implemented as, for example, a solid state drive (SSD) 3 provided with a NAND flash memory.

The computer system 1 includes a host (a host device) 2 and the SSD 3. The host 2 is a computer (host computer) which accesses the SSD 3. Examples of the computer which functions as the host 2 include a personal computer, a server computer and the other various electronic devices (for example, a smartphone and the like).

<Explanations of Connection between Host and SSD, and Communication Protocol>

A path for transmission and reception of a request and information exists between the host 2 and the SSD 3. In addition, standards and the like exist as agreement for transmission and reception of the request and information.

The host 2 transmits various requests to the SSD 3 via a signal line 20. The requests include various data processing requests including a read request for requesting data read, a write request for requesting data write, a state change request for changing a state of the SSD 3, a state acquisition request for acquiring the state of the SSD 3, and the like.

In contrast, the SSD 3 transmits responses to the requests received from the host 2, to the host 2, via the signal line 20. Examples of the responses include results of the data read/data write, a result of the state change, a state of the SSD 3, and the like.

Standards exist as methods of transmitting the requests and responses via the signal line 20 to enable various hosts and various storage devices to be interconnected.

Examples of the standards for transmission and reception of information between the hosts and the storage devices via the signal line 20 include PCI Express (PCIe) (registered trademark).

In addition, examples of the standards of procedures, data formats, and the like for the requests and responses transmitted and received between the hosts and the storage devices include Non-Volatile Memory Express (NVMe) (registered trademark).

In the embodiments, specific standards are not assumed for a system for transmitting and receiving the information via the signal line 20, and the procedures and data formats for transmitting and receiving the requests and responses. The technology of the embodiments can be employed even in a case of employing various standards such as PCIe and NVMe and methods other than the standards.

Furthermore, the host 2 and the SSD 3 do not need to be connected by a physical signal line. The host 2 and the SSD 3 may be connected by a method which does not employ a physical signal line, such as wireless LAN. The technology of the embodiments can be employed even if the host 2 and the SSD 3 are connected by a method using no physical signal line.

<Explanation of Host>

The host 2 comprises a host storage controller 11, a processor 12, and a memory 13 as hardware components. The host storage controller 11, the processor 12, and the memory 13 may be interconnected via the bus 10. The host 2 may further comprise a network interface 14 and a display interface 15.

The host storage controller 11 executes communications with the SSD 3. More specifically, the host storage controller 11 transmits various requests explained above to the SSD 3 and receives the responses to the requests from the SSD 3, under control of the processor 12. The processor 12 is a CPU which controls various components in the host 2, and executes various programs loaded on the memory 13 from the SSD 3. The memory 13 is implemented by a random-access memory such as a dynamic random access memory (DRAM).

<Explanation of SSD>

The SSD 3 comprises a controller 4 and a nonvolatile memory (NAND flash memory) 5. The NAND flash memory 5 may include plural NAND flash memory chips. The controller 4 is electrically connected to the NAND flash memory 5 and operates as a memory controller configured to control the NAND flash memory 5. The controller 4 may be implemented by a circuit such as a System-on-a-chip (SoC). The SSD 3 may comprise a DRAM. When the SSD 3 is configured to comprise a DRAM, the DRAM may be provided outside the controller 4.

The NAND flash memory 5 comprises a memory cell array comprising plural memory cells arranged in a matrix. The NAND flash memory 5 may be a NAND flash memory having a two-dimensional structure or a NAND flash memory having a three-dimensional structure.

<Inner Configuration of Host>

FIG. 2 shows an inner configuration example of the host (host computer) 2.

In the host 2, a storage driver 31, an operating system (OS) 32, a file system 33, a user process 34, and a system process 35 exist as host software operating on the processor 12.

<Explanations of Operating System (OS) and Process>

Features that the memory is allocated to the process and that the operating system (OS) 32, more specifically, a process manager of the operating system (OS) 32 knows all information of the processes running on the host 2 will be explained.

The operating system (OS) 32 includes a process manager 321, a memory manager 322, and a device manager 323.

In the example shown in FIG. 2, three managers mentioned above are included in the operating system (OS) 32, but some or all the file system 33 and the storage driver 31 may be included in the operating system (OS) 32.

The operating system (OS) 32 is, for example, software such as Microsoft Windows (registered trademark) and Linux (registered trademark), and manages resources of the whole computer system 1 including the processor 12, the memory 13, and the SSD 3.

The operating system 32 also manages an application program (hereinafter referred to as program) which runs on the host 2. On the host 2, among the programs each implementing one or more functions, one or more programs is running state under management of the operating system 32.

When a program becomes the running state, the following procedures are executed.

First, the process manager 321 is required to launch a certain program by the user's direct request, or by a request which is sent from the operating system 32 itself to provide the user with a specific function.

Next, the process manager 321 approves the program launch and creates a process for this program. Then, the process manager 321 requests the memory manager 322 to allocate memory for the process. When the memory manager 322 receives the memory allocate request, the memory manager 322 allocates a memory region in the memory 13 to the process. The process manager 321 reads the program from the SSD 3 and loads the program into the memory region allocated to the process. Finally, the process manager 321 sets the process as a target to which an execution time of the processor 12 is allocated. In other words, an entity of execution of the program is a process, and the memory is allocated to the process.

In the present embodiment, the process created by the user's request is called a user process. In contrast, the process other than the user process, such as the process created by the operating system 32 itself to implement a specific function is called a system process.

For example, a process created by a program of a Web browser launched by the user's request for Web browsing is a user process. In contrast, a process created by a program which receives input from a keyboard or a mouse and a process created by a program which makes video output to the display is a system process.

Therefore, the process manager 321 can recognize all processes that exist on the host 2 at a certain time irrespective of the user process and the system process.

<Explanation of Swap of Process>

A feature that a content of the memory region allocated to the process is written to the SSD 3 or read from the SSD 3 at timing of swap out or swap in will be explained.

When the process manager 321 is to create a new process, memory to be allocated to the new process may be short. At this time, the memory manager 322 accepting the request for memory allocation from the process manager 321 may save the data stored in the memory region of the other process to the SSD 3, to reserve the memory region to be allocated to the new process. This save processing is called swap out of the process.

A target process for swap out is selected based on various criteria. For example, a method of selecting processes whose last operation time on the processor 12 is older may be employed in order to select the target process for swap out. In addition, for example, a method of selecting processes whose creation time is older may also be employed in order to select the target process for swap out. Furthermore, for example, a method of limiting the process to be selected as the target process for swap out to the user process may also be employed.

Anyway, the data stored in the memory region allocated to the process may be written to the SSD 3 by swap out.

When the process once subjected to swap out runs again on the processor 12, processing of reading the data, which is written to the SSD 3 by the swap out, from the SSD 3 and restoring the data to the memory region in the memory 13 is executed. This restoration processing is called swap in of the process.

In the present embodiment, the process manager 321 performs the processing for swap out and the processing for swap in.

<Explanation of Processing in a case where Process accesses SSD 3>

Features that in a case where each process accesses the SSD 3 via the file system 33, the file system 33 recognizes when and which process accessed which logical address (logical block address: LBA) and that a path for accessing the SSD 3 without going via the file system 33 also exists will be explained.

When the process executes reading data from or writing data to the SSD 3, reading data from or writing data to the file system 33 is generally required. This is common to the user process and the system process.

When reading data from or writing data to the SSD 3 via the file system 33, the process transmits the access request to the file system 33. More specifically, the process designates for the file system 33 a filename to be read or written, type of read/write, a data size to be read or written, and a read destination region in the case of data read or a memory region where data to be written is stored in the case of data write.

The file system 33 checks whether the process has permission to the designated file and, approves the access request if the process has the permission or dismisses the access request if the process does not have the permission.

That is, the file system 33 recognizes when and which process required an access to which file.

When the file system 33 approves the access request of the process, the file system 33 resolves logic block address (LBA) of the SSD 3 corresponding to the file for access.

In the data read, based on a table which is in the file system 33 itself and shows the correspondence between the filenames and the LBAs, the file system 33 creates one or more groups of the starting LBA and size, which request the SSD 3 to read data. Plural groups of the starting LBA and size may be created in a case where the data constituting one file may be divided (fragmented) into plural regions in the LBA space of the SSD 3.

In the data write, the file system 33 selects one or more LBA regions to be allocated to the write request, from unused LBA regions (free LBA regions) which are managed by the file system 33 itself, and creates one or more groups of the starting LBA and size. Plural groups of the starting LBA and the size may be created in a case where consecutive unused LBA regions (free LBA regions) where data having a size designated by the write request can be stored together may not exist.

When the file system 33 creates request information which requests the SSD 3 to read/write data and includes the one or more groups of starting LBA and size to which the data should be read or written, the file system 33 transmits a request for data read/data write to the storage driver 31 together with the request information.

The storage driver 31 creates an operation for the host storage controller 11 from the request for data read/write received from the file system 33, appropriately operates the host storage controller 11, and transmits the read/write request (read/write command) to the SSD 3 via the signal line 20.

The storage driver 31 receives the result of the read/write request returned from the SSD 3 via the host storage controller 11, and transmits the result of the read/write request to the file system 33 which has transmitted the request for data read/write. The file system 33 transmits the result of the request for data read/write to the process which has originally required the request for data read/write.

Thus, reading the data from the SSD 3 by the process and writing the data to the SSD 3 by the process are processed. Therefore, the file system 33 recognizes when and which process accessed which LBA.

The request transmitted from the process to the SSD 3 is not the read/write request alone. For example, requests for acquiring from the SSD 3 statistical information such as a total amount of write data to the SSD 3 and a total amount of read data from the SSD 3, and a request for changing the state of the SSD 3 to a low power consumption state may be transmitted to the SSD 3.

These requests are often transmitted not via the file system 33, but directly from the process to the storage driver 31.

The file system 33 is, for example, NT File System (NTFS), fourth extended file system (ext4), or the like. Plural file systems may exist in the host 2.

<Explanation of Configuration of SSD 3>

A feature that a data controlling unit 403 of the SSD 3 manages correspondence between LBAs designated by the host 2 to read/write the data and storage locations on the NAND flash memory 5 where latest data corresponding to the LBAs are stored, will be explained.

FIG. 3 shows a configuration example of the SSD 3.

The SSD 3 includes the controller 4 and the NAND flash memory 5 as shown in FIG. 1. As shown in FIG. 3, the controller 4 includes an interface controller 401, a host request processing unit 402, a data controlling unit 403, a buffer memory 404, a direct memory access controller (DMAC) 405, an error correction code processing unit 406, and a NAND interface controller 407.

The interface controller 401 receives the processing request for the SSD 3 which is transmitted from the host 2 via the signal line 20, and notifies the host request processing unit 402 of the content of this request. In addition, the interface controller 401 transmits a response of the processing result to the request from the host 2, to the host 2, via the signal line 20, in response to the request from the host request processing unit 402. The interface controller 401 reads, from the memory 13 of the host 2 side, write data to be written, and writes the write data to the buffer memory 404, under instructions from the DMAC 405. Further, the interface controller 401 reads, from the buffer memory 404, the data designated by the read request received from the host 2 and writes the data to the memory 13 of the host 2 side, under instructions from the DMAC 405.

The host request processing unit 402 receives from the interface controller 401 the processing request which is transmitted from the host 2, interprets the content of the processing request, and controls the operation inside the SSD 3 in accordance with the content of the processing request.

When receiving the read request (read command) from the host 2, for example, the host request processing unit 402 instructs the data controlling unit 403 to read the data designated by the read request from the NAND flash memory 5 to the buffer memory 404, and transfers the data in the buffer memory 404 to the memory 13 of the host 2 side by operating the DMAC 405. In addition, when receiving the write request (write command) from the host 2, for example, the host request processing unit 402 transfers the write data from the memory 13 of the host 2 side to the buffer memory 404 by operating the DMAC 405, and instructs the data controlling unit 403 to write the write data in the buffer memory 404 to the NAND flash memory. Then, when completing the processing of the request received from the host 2, the host request processing unit 402 transmits the processing result to the host 2.

The requests received from the host 2 by the SSD 3 are not the read request and the write request alone. As explained above, for example, the requests for acquiring the statistical information such as a total amount of write data and a total amount of read data, and the request for changing the state of the SSD 3 to a low power consumption state may be received. When the host request processing unit 402 receives these requests, the host request processing unit 402 requests the data controlling unit 403 to perform specific processing, thereby implements desired processing.

The data controlling unit 403 executes management of the data stored in the SSD 3 and control of access to the NAND flash memory 5. More specifically, the data controlling unit 403 holds a group of LBA designated by the host and location information indicative of a storage location in the NAND flash memory 5 where the latest data corresponding to the LBA is stored. The location information in the NAND flash memory 5 is called a NAND physical address (NPA). In addition, a table for managing the correspondence between each of LBA and each of NPA, which is managed by the data controlling unit 403, is called a logical-to-physical address translation table.

The NAND flash memory 5 includes one or more NAND flash memory chips including memory cell arrays. The memory cell array includes plural memory cells arranged in a matrix. The memory cell array of the NAND flash memory 5 includes plural blocks (physical blocks) BLK 0 to BLK (j−1) as shown in FIG. 4. BLK 0 to BLK (j−1) function as a unit of an erase operation.

BLK 0 to BLK (j−1) include plural pages (physical pages). In other words, each of BLK 0 to BLK (j−1) includes pages P0, P1, . . . P(k−1). Each of the pages includes plural memory cells connected to the same word line. In the NAND flash memory 5, data read and data write are executed in units of pages.

<Explanation of Processing of writing Data to SSD 3>

Updating the logical-to-physical address translation table at the data write will be explained.

When the data write request is transmitted from the host 2 to the SSD 3, the controller 4 of the SSD 3 executes the processing as follows.

In the controller 4, the host request processing unit 402 first receives the write request via the interface controller 401.

The write request includes the starting LBA of a write destination LBA region, the write size, and a starting address of the host memory where the write data is stored. Thus, the host request processing unit 402 transfers data for the write size from the starting address of the host memory to the buffer memory 404 by operating the DMAC 405. Then, the host request processing unit 402 instructs the data controlling unit 403 to write the data in the buffer memory 404 to the NAND flash memory 5.

The host request processing unit 402 may transmit the response to the write request received from the host 2 when finishing transfer of all the data which are required to be written to the buffer memory 404 or may transmit the response to the host 2 when finishing write of all the data to the NAND flash memory 5.

When the data controlling unit 403 receives the instruction to write the data from the host request processing unit 402, the data controlling unit 403 determines NPA corresponds to a storage location of the NAND flash memory 5 where the data should be written, operates the error correction code processing unit 406 to create coding data including the data and the error correction code from the data as needed, and operates the NAND interface controller 407 to write the data (or the coded data) to the NAND flash memory 5.

After writing the data to the NAND flash memory 5, the data controlling unit 403 updates the logical-to-physical address translation table such that the NPA indicative of the storage location where the data is written is associated with the LBA of the data. In the logical-to-physical address translation table, if NPA corresponding to old data of the LBA is associated with the LBA, the NPA corresponding to the old data is updated to the NPA (new NPA) indicative of the storage location where the data is written. Thus, the content of the logical-to-physical address translation table is managed such that the correspondence between LBAs and NPAs is the latest at any time.

<Use of Degree of Multi-level>

A feature that the SSD 3 can write data to the NAND flash memory 5 by arbitrarily using plural types of program modes (SLC mode/MLC mode/TLC mode) different in degree of multi-level indicative of the number of bits stored in one memory cell, will be explained.

For example, in a case where the NAND flash memory 5 is implemented as a triple-level cell (TLC)-NAND flash memory in which 3-bit data is stored in one memory cell, the NAND flash memory 5 can write the data to the memory cell array of the NAND flash memory 5 by selectively using plural program mode different in degree of multi-level, i.e., (1) the single-level cell (SLC) mode in which 1-bit data is stored in one memory cell, (2) multi-level cell (MLC) mode in which 2-bit data is stored in one memory cell, and (3) triple-level cell (TLC) mode in which 3-bit data is stored in one memory cell.

In general, if the data amount (the number bits) written to one memory cell is larger, i.e., the degree of multi-level is higher, the memory cost is lower and the use efficiency of the NAND flash memory 5 is higher. However, to write the data to the memory cell in the program mode of high degree of multi-level and to read the data written in the program mode of high degree of multi-level from the memory cell, complicated processing is often required and the time for data write/read is often longer.

Therefore, when the data controlling unit 403 needs to complete the write request instructed by the host 2 as soon as possible, the data controlling unit 403 may write the data to a block of the NAND flash memory 5 in a program mode of a low degree of multi-level such as the SLC mode.

Oppositely, when the data controlling unit 403 needs to raise the use efficiency of the NAND flash memory 5, the data controlling unit 403 executes garbage collection (GC) and the like and rewrites the data written in the program mode of a low degree of multi-level, in the program mode of a higher degree of multi-level such as the TLC mode. GC is an operation of moving valid data in several blocks (GC source blocks) in which valid data and invalid data exist together to a new block (GC destination block) and setting each GC source block to a free block which does not include valid data.

Change of the program mode is executed in units of blocks of the NAND flash memory 5. In other words, plural blocks included in the NAND flash memory 5 are selectively used as any one of several types of blocks different in degree of multi-level indicative of the number of bits stored in one memory cell.

The block of the NAND flash memory 5 used as SLC (i.e., the block to which the data is written in the SLC mode) is hereinafter called SLC block. Similarly to this, the block of the NAND flash memory 5 used as MLC (i.e., the block to which the data is written in the MLC mode) is called MLC block, and the block of the NAND flash memory 5 used as TLC (i.e., the block to which the data is written in the TLC mode) is called TLC block.

For example, the data controlling unit 403 may first write the write data corresponding to almost all the write requests received from the host 2 to the blocks each having a low degree of multi-level (for example, the SLC block), to complete the data write by the host 2 quickly. Then, the data controlling unit 403 may move the data (valid data) stored in one or more blocks having a low degree of multi-level to one or more blocks having a higher degree of multi-level (MLC blocks or TLC blocks).

The data movement is indicative of copying the data stored in at least one block (move source block) of the NAND flash memory 5 to at least one of the other blocks (move destination block) of the NAND flash memory 5 to invalidate this data in the move source block.

In addition, the valid data is indicative of the latest data associated with a logical address such as LBA. The invalid data is indicative of old data that is not associated with any logical addresses.

To control the movement processing, the data controlling unit 403 creates the management table as shown in FIG. 5 and manages the use state of the NAND flash memory 5.

<Explanation of Table for managing Use Status of NAND Flash Memory>

FIG. 5 shows a table managing a use state of the NAND flash memory 5 in the SSD 3, which is created and managed by the data controlling unit 403. This table is hereinafter called a NAND management table.

On the NAND management table shown in FIG. 5, the block count (use block count) indicative of the number of blocks of the NAND flash memory 5 used at each degree of multi-level, the total amount of the valid data (valid data amount) stored in the used block, (iii) the maximum block number available at each degree of multi-level, the maximum data amount which can be stored when the maximum block count is used at each degree of multi-level, and the empty block count (free block count) currently available at each degree of multi-level are stored and managed per degree of multi-level available of the NAND flash memory 5 such as SLC, MLC and TLC.

In addition, the use block count of the whole SSD 3, the valid data amount of the whole SSD 3, the maximum block count of the whole SSD 3, the maximum data amount of the whole SSD 3, and the free block count of the whole SSD 3 are also stored and managed irrespective of the degree of multi-level, on the NAND management table shown in FIG. 5.

When the data controlling unit 403 writes the data to the NAND flash memory 5, the data controlling unit 403 updates the NAND management table in accordance with the degree of multi-level used for the writing of the data. For example, if the data controlling unit 403 acquires one block from free blocks of SLC and writes 4 Kbyte data to the block in SLC mode, the data controlling unit 403 increments the use block count of row of SLC in the NAND management table by 1, decrements the free block count of row of SLC by 1 and increments the valid data amount of row of SLC in the NAND management table by 4 Kbytes.

At this time, for example, if 4 Kbyte data stored in the MLC block by writing of the data become old data (invalid data), the data controlling unit 403 decreases the valid data amount of row of MLC in the NAND management table by 4 Kbytes.

In addition, the data controlling unit 403 increments the use block count of row of the whole SSD by 1 and decrements the free block count of row of the whole SSD by 1. The valid data amount of row of the whole SSD is not varied. This is because 4 Kbyte data newly written to the SLC block become valid data and, instead, 4 Kbyte data stored in the MLC block become invalid data.

<Explanation of what can be recognized from NAND Management Table>

The following matters concerning the state inside the SSD 3 can be recognized from the NAND management table shown in FIG. 5.

It can be recognized that if the use block count of the SLC block is increased the use efficiency of the NAND flash memory 5 is lowered. The SLC blocks are quick reading and writing, but use efficiency is poor since the degree of multi-level is low. The maximum block count used as the SLC block therefore needs to be set to be somewhat smaller.

If the use block count of SLC is close to the preset maximum block count for the SLC block, the use efficiency of the NAND flash memory 5 is lowered and a SLC block cannot be allocated to further write request from the host 2. It is therefore determined that the data stored in one or more SLC blocks needs to be moved to one or more blocks having a higher degree of multi-level.

In addition, if the valid data amount is smaller than the maximum data amount for all degrees of multi-level although the use block count for all degrees of multi-level is increased, it can be recognized that much invalid data exist and a number of blocks in the NAND flash memory 5 are not used effectively.

At this time, the whole free block count is decreased simultaneously. It can be therefore determined that the data controlling unit 403 needs to decrease the use block count and to increase the free block count by GC.

Thus, the data controlling unit 403 can determine what processing is next required by checking the use status of the NAND flash memory 5 in the SSD 3 by using the NAND management table shown in FIG. 5.

<Explanation of Data Move Processing of First Embodiment>

First, a summary of data move processing of the first embodiment will be explained.

A process monitor 41 is added the host software executed by the processor 12 of the host 2. The process monitor 41 recognizes the number of processes running on the host 2 and can notify the SSD 3 of the total number of processes. The process monitor 41 may notify the SSD 3 of the increase and decrease in total number of processes.

The controller 4 of the SSD 3 determines whether the total number of processes notified by the host 2 exceeds a certain threshold value or not, and executes the processing of moving the data stored in the blocks having a low degree of multi-level to the blocks having a higher degree of multi-level if the total number of processes exceeds the threshold value. In this case, for example, processing of moving the data (valid data) stored in the SLC block to the MLC block or TLC block is executed. The currently used SLC block can be thereby set as a free block. As explained above, if the total number of processes is increased, swap out and swap in easily occur. In the present embodiment, since the processing of moving the data stored in the blocks having a low degree of multi-level to the blocks having a higher degree of multi-level is executed based on the total number of processes, the free block count of the blocks (for example, SLC blocks) having a low degree of multi-level can be increased before swap out and swap in easily occur. Thus, when swap out or swap in of process occurs later, the probability of using the blocks having a low degree of multi-level for data write and data read is increased. As a result, the time spent for swap out and swap in can be reduced.

The data movement may be executed between the blocks having the same degree of multi-level. This data movement is one type of GC explained above. The embodiment can prepare for the subsequent write request from the host 2 by allocating the free blocks created by the data movement as the free blocks of SLC.

In addition, the processing of moving the data does not need to be executed immediately when the total number of processes is determined to exceed a certain threshold value but may be executed after the total number of processes is determined to exceed the threshold value.

For example, when the total number of processes is determined to exceed a certain threshold value, the controller 4 (for example, host request processing unit 402) may determine that the processing of moving the data should be executed and may place the processing for data movement in a queue.

Alternatively, the host request processing unit 402 may raise the priority to the processing for data movement by a trigger which is an occurrence that the total number of processes has exceeded a certain threshold value. Since the priority to the processing for data movement becomes higher than the priority to several other processing, the processing for data movement can be executed in preference to several other processing.

Alternatively, the host request processing unit 402 may determine that the processing for moving the data should be executed, when it is determined that the total number of processes has exceeded a certain threshold value, may wait until the condition that the valid data amount of SLC is reduced to a certain threshold value or the free block count of the whole SSD 3 is reduced to a certain threshold value is met, and may execute the processing for data movement when the condition is met.

A specific configuration for implementing data move processing based on the total number of processes will be hereinafter explained.

FIG. 6 shows an inner configuration example of the host 2 including the process monitor 41.

The configuration example of FIG. 6 is formed by adding the process monitor 41 to the configuration example of FIG. 2.

The process monitor 41 communicates with the process manager 321 and the memory manager 322 of the OS 32, and the file system 33, and acquires information indicative of (i) processes running on the host 2, (ii) memory regions allocated to the respective processes, (iii) their region sizes, and (iv) the LBAs of the SSD 3 which are accessed by the processes.

More specifically, the process monitor 41 manages the information by using a management table as shown in FIG. 7. The management table as shown in FIG. 7 includes plural entries (rows) corresponding to the plural processes. Each row includes a process identifier field, a process type field, a memory usage field, plural LBA use list fields, and a latest launch time field.

In a row corresponding to a certain process, the process identifier field is indicative of an identifier of this process. The process type field is indicative of the type (user process/system process) of this process. The memory usage field is indicative of the capacity of the memory region on the host memory used by this process. The LBA use list field is indicative of a list of the LBAs of the SSD 3 which are accessed (read/written) by this process. The latest launch time field is indicative of the time at which this process is lastly launched.

As explained above, when creating a process, the process manager 321 reads the program from the SSD 3 and the process issues a read/write request for the SSD 3. Therefore, there is a high likelihood that if the process is created the data write to the SSD 3 and data read from the SSD 3 will be executed.

When the process monitor 41 detects that the process has been created, by inquiring the process manager 321, the process monitor 41 notifies the SSD 3 of this matter. This notice to the SSD 3 may be made by using a command under standards such as NVMe, or may be made by using other methods.

In the controller 4 of the SSD 3 which is notified that the number of processes is increased from the host 2, the host request processing unit 402 receiving the notice instructs the data controlling unit 403 to move the data stored in the blocks having a low degree of multi-level to the blocks having a higher degree of multi-level, thereby increases the free block count for the blocks having a low degree of multi-level and prepares for subsequent access from the host 2.

In addition, the decrease in the number of processes indicates that the one or more processes are terminated. If the processes are terminated, there is a high likelihood that the data read and written by the terminated processes for the SSD 3 will not be accessed for a while.

Thus, when the process monitor 41 detects that the processes are terminated, by inquiring the process manager 321, the process monitor 41 notifies the SSD 3 of this matter. This notice to the SSD 3 may also be made by using a command under standards such as NVMe or other methods.

In the controller 4 of the SSD 3 which is notified that the number of processes is decreased from the host 2, the host request processing unit 402 receiving the notice instructs the data controlling unit 403 to move the data stored in the blocks having a low degree of multi-level to the blocks having a higher degree of multi-level, thereby increases the free block count for the blocks having a low degree of multi-level and attempts improvement of the use efficiency of the NAND flash memory 5.

Furthermore, decrease in total number of processes is indicative of high likelihood that a small number of read/write requests will be transmitted from the host 2 to the SSD 3.

In addition, increase in total number of processes is indicative of high likelihood that the above-explained process swap out and swap in will occur.

Thus, the process monitor 41 manages the total number of processes, based on the result of inquiry to the process manager 321 and notifies the SSD 3 of the total number of processes. This notice to the SSD 3 may also be made by using a command under standards such as NVMe or other methods. The process monitor 41 may notify the SSD 3 of the total number of processes when the number of processes increases or decreases, or the process monitor 41 may periodically notify the SSD 3 of the total number of processes.

In the controller 4 of the SSD 3 which is notified of the total number of processes by the host 2, the host request processing unit 402 receiving the notice checks whether the total number of processes of the notice exceeds a preset threshold value (first threshold value).

If the total number of processes exceeds the first threshold value, the host request processing unit 402 instructs the data controlling unit 403 to move the data stored in the blocks having a low degree of multi-level to the blocks having a higher degree of multi-level. Thus, since the data stored in the blocks having a low degree of multi-level are moved to the blocks having a higher degree of multi-level, the free block count for the blocks having a low degree of multi-level is increased. Therefore, when swap out and swap in of the process occurs later, the likelihood that the blocks having a low degree of multi-level can be used becomes higher. As a result, the time spent for swap out and swap in can be reduced and the performance of the SSD 3 seen from the host 2 and the performance of the SSD 3 seen from the user can be improved.

In addition, the host request processing unit 402 checks whether the total number of processes is below a preset threshold value (second threshold value). For example, the second threshold value is smaller than the first threshold value.

If the total number of processes is below the second threshold value, the host request processing unit 402 instructs the data controlling unit 403 to move the data stored in the blocks having a low degree of multi-level to the blocks having a higher degree of multi-level. Thus, since the data stored in the blocks having a low degree of multi-level are moved to the blocks having a higher degree of multi-level, the free block count for the blocks having a low degree of multi-level is increased, and the use efficiency of the NAND flash memory 5 is improved.

The flowchart of FIG. 8 shows a procedure of the total process number notice processing and the data move processing, which are executed by the host 2 and the SSD 3.

The process monitor 41 of the host 2 cooperates with the process manager 321 to manage the total number of processes running on the processor 12 of the host 2 (step S11). If the notice condition that the total number of processes is increased or decreased or that a certain period has passed after the previous notice is met (YES in step S12), the process monitor 41 transmits the information indicative of the total number of processes to the SSD 3 and notifies the SSD 3 of the total number of processes (step S13).

The controller 4 of the SSD 3 receives the notice indicative of the total number of processes from the host 2 (step S21). The host request processing unit 402 of the controller 4 compares the total number of processes which is notified by the host 2 with the first threshold value, and determines whether the total number of processes exceeds the first threshold value or not (step S22).

If the total number of processes exceeds the first threshold value (YES in step S22), the host request processing unit 402 executes the processing of moving the data stored in the blocks having a low degree of multi-level to the blocks having a higher degree of multi-level, by using the data controlling unit 403 (step S23). In step S23, the host request processing unit 402 instructs the data controlling unit 403 to move the data. Then, the data controlling unit 403 executes processing of moving the data from the blocks having a low degree of multi-level to the blocks having a higher degree of multi-level. For example, the data controlling unit 403 reads the data (valid data) stored in the SLC blocks, writes the data to the MLC blocks in the MLC mode or writes the data to the TLC blocks in the TLC mode. The data stored in the SLC blocks is thereby moved from the SLC blocks to the MLC blocks or the TLC blocks. The SLC blocks in which no valid data exist due to the data movement become free blocks.

Therefore, the free blocks of SLC can be preliminarily reserved before swap out occurs due to the increase in the number of processes running on the host 2 (processor 12), and the time required for swap out can be reduced. As a result, the performance of the whole computer system 1 can be improved.

If the total number of processes does not exceed the first threshold value (NO in step S22), the host request processing unit 402 compares the total number of processes with the second threshold value (<first threshold value) and whether the total number of processes is below the second threshold value or not (step S24).

If the total number of processes is below the second threshold value (YES in step S24), the host request processing unit 402 executes the processing of moving the data stored in the blocks having a low degree of multi-level to the blocks having a higher degree of multi-level, by using the data controlling unit 403 (step S25). In step S25, the host request processing unit 402 instructs the data controlling unit 403 to move the data. Then, the data controlling unit 403 executes processing of moving the data from the blocks having a low degree of multi-level to the blocks having a higher degree of multi-level. For example, the data controlling unit 403 reads the data (valid data) stored in the SLC blocks, writes the data to the MLC blocks in the MLC mode or writes the data to the TLC blocks in the TLC mode. The data stored in the SLC blocks is thereby moved from the SLC blocks to the MLC blocks or the TLC blocks. The use efficiency of the NAND flash memory 5 is improved because of the data movement.

In step S23, processing of moving the data stored in the blocks having a low degree of multi-level to the blocks having a higher degree of multi-level is executed but, for example, the data (valid data) may be moved between the TLC blocks. As explained above, this data movement is one type of GC. In this case, too, the embodiment can prepare for future swap out by allocating the free blocks created by the data movement as the free blocks for SLC.

Similarly, in step S25, too, for example, the data (valid data) may be moved between the TLC blocks.

Figure 9:
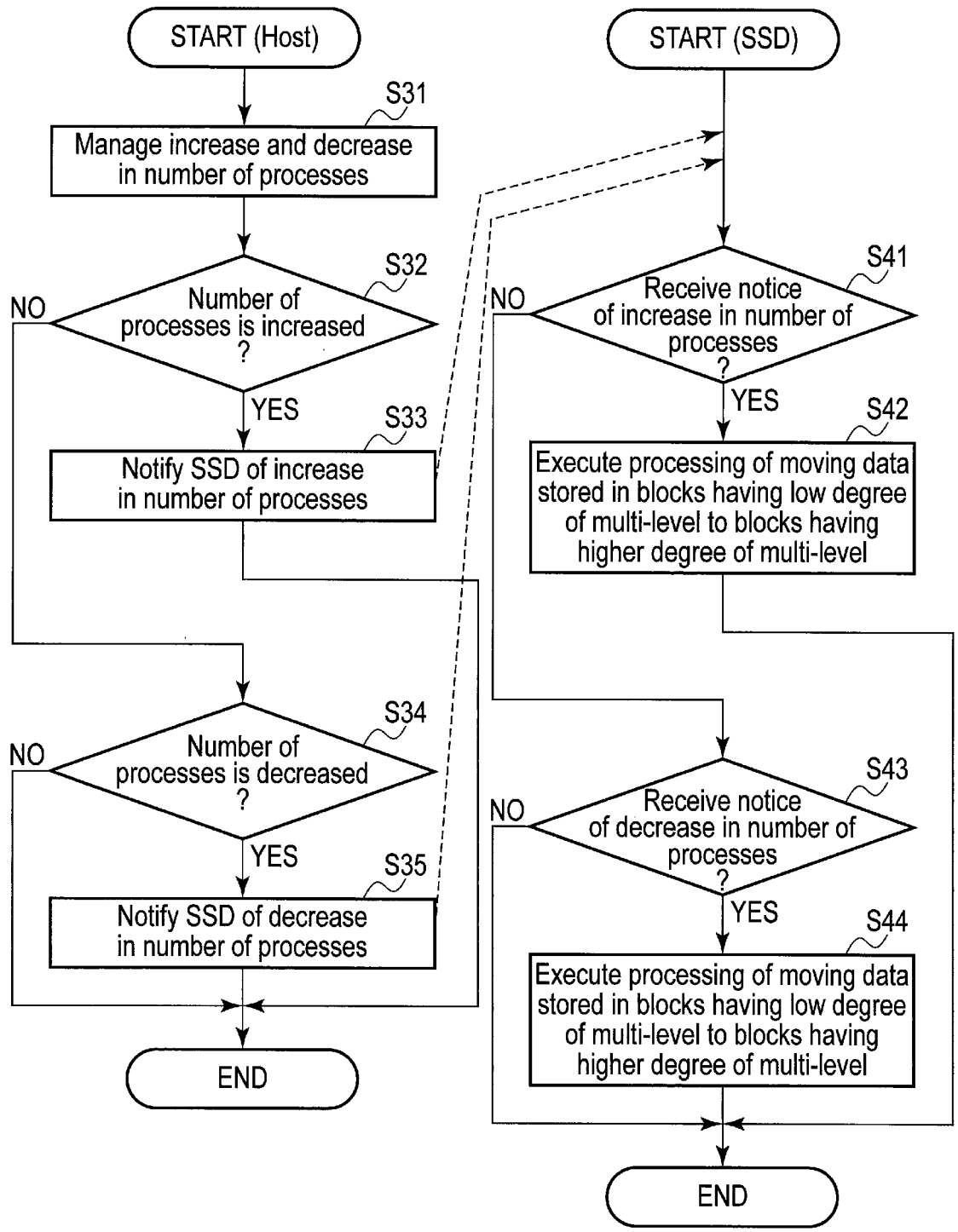
FIG. 9 is a flowchart showing a procedure of process number increase/decrease notice processing and data move processing, which are executed by the host and the storage device of the first embodiment.

The flowchart of FIG. 9 shows a procedure of the process number increase/decrease notice processing and the data move processing, which are executed by the host 2 and the SSD 3.

The process monitor 41 of the host 2 cooperates with the process manager 321 to manage the increase and decrease in total number of processes running on the processor 12 of the host 2 (step S31).

If the total number of processes is increased (YES in step S32), the process monitor 41 transmits the notice indicative of the increase in total number of processes to the SSD 3 (step S33).

In contrast, if the total number of processes is decreased (YES in step S34), the process monitor 41 transmits the notice indicative of the decrease in total number of processes to the SSD 3 (step S35).

If the controller 4 of the SSD 3 receives the notice indicative of the increase in total number of processes from the host 2 (YES in step S41), the host request processing unit 402 executes the processing of moving the data stored in the blocks having a low degree of multi-level to the blocks having a higher degree of multi-level, by using the data controlling unit 403 (step S42). In step S42, the host request processing unit 402 instructs the data controlling unit 403 to move the data, and the data controlling unit 403 moves the data from the blocks having a low degree of multi-level to the blocks having a higher degree of multi-level. For example, the data controlling unit 403 reads the data (valid data) stored in the SLC blocks, writes the data to the MLC blocks in the MLC mode or writes the data to the TLC blocks in the TLC mode. The data stored in the SLC blocks is thereby moved from the SLC blocks to the MLC blocks or the TLC blocks. The SLC blocks in which no valid data exist due to the data movement become free blocks.

Therefore, before swap out occurs, the free blocks for SLC can be preliminarily reserved, and the time required for swap out can be reduced. As a result, the performance of the whole computer system 1 can be improved.

If the controller 4 of the SSD 3 receives the notice indicative of the decrease in total number of processes from the host 2 (YES in step S43), the host request processing unit 402 executes the processing of moving the data stored in the blocks having a low degree of multi-level to the blocks having a higher degree of multi-level, by using the data controlling unit 403 (step S44). In step S44, the host request processing unit 402 instructs the data controlling unit 403 to move the data, and the data controlling unit 403 moves the data from the blocks having a low degree of multi-level to the blocks having a higher degree of multi-level. For example, the data controlling unit 403 reads the data (valid data) stored in the SLC blocks, writes the data to the MLC blocks in the MLC mode or writes the data to the TLC blocks in the TLC mode. The data stored in the SLC blocks is thereby moved from the SLC blocks to the MLC blocks or the TLC blocks. The use efficiency of the NAND flash memory 5 is improved because of the data movement.

In step S42, the data stored in the blocks having a low degree of multi-level is moved to the blocks having a higher degree of multi-level but, for example, the data (valid data) may be moved between the TLC blocks. As explained above, this data movement is one type of GC. In this case, too, the embodiment can prepare for future swap out by allocating the free blocks created by the data movement as the free blocks for SLC.

Similarly, in step S44, too, for example, the data (valid data) may be moved between the TLC blocks. Fragmentation of the TLC blocks can be thereby reduced.

The processing of the host 2 explained with reference to the flowchart of FIG. 8 and the flowchart of FIG. 9 is executed by the processor 12 configured to execute the host software (storage driver 31, operating system (OS) 32, file system 33, process monitor 41, and the like).

Second Embodiment

In the first embodiment, the data movement is executed, based on the total number of processes (or increase and decrease in total number of processes) of which the host 2 notifies the SSD 3. In the second embodiment, the host 2 notifies the SSD 3 of an identifier of each process, and data written by a specific process is moved between blocks. Hardware configuration of the SSD 3 and hardware configuration of the host 2 in the second embodiment are the same as those in the first embodiment.

<Explanation of Data Move Processing of Second Embodiment>

First, a summary of data move processing of the second embodiment will be explained.

The host 2 can notify the SSD 3 of information indicative of an identifier of each process created by the host 2. In addition, the host 2 can transmit to the SSD 3 each of write requests to which identifiers of processes requiring the data write are assigned respectively. A controller 4 of the SSD 3 manages correspondence between an identifier of each of created processes and an address range corresponding to the data written by each of the created processes, by using a management table.

After receiving the notice indicative of termination of a certain process from the host 2, the controller 4 of the SSD 3 executes the processing of moving the data written to the NAND flash memory 5 by the terminated process from blocks having a low degree of multi-level to blocks having a higher degree of multi-level, based on the management table.

The data corresponding to the terminated process is not accessed by the host 2 for a while. Therefore, even if the data corresponding to the terminated process is moved to the blocks having a higher degree of multi-level, a phenomenon that read speed of this data is lowered does not occur. The embodiment can prepare for the subsequent write request from the host 2 without causing degradation in performance.

The movement of the data corresponding to the terminated process may be executed between the blocks having the same degree of multi-level. In this case, too, the data movement is one type of GC explained above. The embodiment can prepare for the subsequent write request from the host 2 by allocating the free blocks created by the data movement as the free blocks of SLC.

In addition, the host 2 may transmit to the SSD 3 not only the write requests to which identifiers of the processes requiring the data write are assigned respectively, but also the read requests to which identifiers of the processes requiring the data read are assigned respectively. In this case, the controller 4 of the SSD 3 may manage the correspondence between the identifier of each of the created processes and an address range corresponding to the data accessed (read or written) by each of the created processes, by using a management table. Then, after receiving the notice indicative of termination of a certain process from the host 2, the controller 4 of the SSD 3 moves the data accessed (read or written) by the terminated process from the blocks having a low degree of multi-level to the blocks having a higher degree of multi-level, based on the management table.

In addition, the processing of moving the data does not need to be executed immediately at the time when the host 2 notifies the controller 4 of the terminated process but may be executed after that time, similarly to the first embodiment.

A specific configuration for implementing the data move processing of the second embodiment will be hereinafter explained.

FIG. 10 shows an inner configuration example of the host 2.

The inner configuration example shown in FIG. 10 is different from the inner configuration example shown in FIG. 6 with respect to a feature that a filter driver 42 is added to a front stage of a storage driver 31.

As explained in the first embodiment, a process monitor 41 of the host 2 recognizes each of processes running on the host 2. In addition, the process monitor 41 acquires information indicative of an LBA region (LBA range) read/written by each of the processes, from a file system 33. Each of the read requests and the write requests includes information (starting LBA and data size) designating an access destination LBA region. For this reason, by referring to the access destination LBA region included in the read/write request, the process monitor 41 can specify a process of the request source which requires the data read/write and can further assign an identifier of the specified process to the read/write request by using the filter driver 42. Therefore, the storage driver 31 can transmit to the SSD 3 the read/write requests to which the identifiers of the processes requiring the data read/write are assigned. In this case, the read/write requests (read/write commands) including the process identifiers may be transmitted to the SSD 3.

The controller 4 of the SSD 3 receives the read/write requests to which the process identifiers are assigned from the host 2. Therefore, the controller 4 can detect the process identifiers of the request sources which require data read/write, based on the read/write requests.

The process identifier may be process ID, ID of the program which is the source of the process, the name of the program, or a file name of the program.

The data controlling unit 403 of the SSD 3 creates a table (hereinafter called a process data management table) shown in FIG. 11 by using the process identifiers included in the received read/write requests.

The data controlling unit 403 manages correspondence between the identifiers of the processes requiring the data read/write and address ranges corresponding to data accessed (read/written) by the processes.

The process data management table includes plural entries (rows) corresponding to the plural processes. Each row includes a process identifier field, an SLC field, an MLC field, a TLC field, a process type field, an LBA/multi-level degree field, and a latest access time field.

In a row corresponding to a certain process, the process identifier field is indicative of an identifier of this process. The SLC field is indicative of the data amount stored in the SLC mode, of the total data amount accessed by this process. The MLC field is indicative of the data amount stored in the MLC mode, of the total data amount accessed by this process. The TLC field is indicative of the data amount stored in the TLC mode, of the total data amount accessed by this process. The process type field indicates whether this process is a system process or a user process. The LBA region/multi-level degree field indicates each of the LBA regions (starting LBAs and sizes (the numbers of logical blocks)) accessed (read/written) by this process. The LBA region/multi-level degree field further indicates the degree of multi-level of the block where the data corresponding to each LBA region is stored. The LBA region is indicative of an address range corresponding to the data read/written by this process. The latest access time field is indicative of a latest access time when the process lastly accessed the SSD 3, i.e., the latest access time when the process finally executed reading the data from the SSD 3 or writing the data to the SSD 3. The latest access time may be managed for each LBA region as shown in FIG. 11.

In the present embodiment, the data of the same process can be dispersed into plural blocks having different degrees of multi-level, by moving the data between blocks having different degrees of multi-level. For example, the program corresponding to a certain process may be stored in a block having a high degree of multi-level such as the TLC block or data such as a file created by the process may be stored in the SLC block. In this case, the degree of multi-level corresponding to the LBA region allocated to this program is indicative of TLC, and the degree of multi-level corresponding to the LBA region allocated to the data such as the file is indicative of SLC. In general, the programs are rarely updated while the data such as the file is updated with comparatively high frequency. Therefore, both reading/writing the data such as the file at a high speed and improving the use efficiency of the NAND flash memory 5 can be implemented by employing data placement of storing the program corresponding to a certain process in the block having a high degree of multi-level such as the TLC block and storing the data such as a file created by this process in the SLC block.

The process data management table shown in FIG. 11 is managed and updated by the data controlling unit 403, similarly to the NAND management table shown in FIG. 5.

Timing of adding a new process row to the process data management table is the time when, for example, the process monitor 41 of the host 2 notifies the SSD 3 that the process is created. For example, the process monitor 41 may transmit the information including the identifier of a process created by the host 2 to the SSD 3 as a notice indicative of the creation of the process.

In contrast, timing of deleting a specific process row in the process data management table is the time when, for example, the process monitor 41 of the host 2 notifies the SSD 3 that the process is terminated. For example, the process monitor 41 may transmit the information including the identifier of the process terminated by the host 2 to the SSD 3 as a notice indicative of the termination of the process.

A method of not deleting the process row in the process data management table even if the host 2 notifies the SSD 3 that the process is terminated can be considered.

In particular, in a configuration of using the program name which is the process source as the identifier to identify the process, a method of use of leaving the data (rows) concerning the terminated processes in the process data management table in order to prepare for a case in which the same program may be launched later is considered. In this case, the timing of deleting this data (rows) in the process data management table is considered to be the time when the size of the process data management table becomes too large.

Specific processing for moving data of the terminated process is as follows.

First, the process monitor 41 of the host 2 notifies the SSD 3 of the identifier of the terminated process when the process is terminated. After receiving the identifier of the terminated process from the host 2, the controller 4 of the SSD 3 specifies the row of the terminated process in the process data management table, and moves the data accessed by the terminated process (for example, data written to the NAND flash memory 5 by the terminated process, or data read from or written to the NAND flash memory 5 by the terminated process) to the block having a higher degree of multi-level. Thus, the number of free blocks about the blocks having a low degree of multi-level can be increased more efficiently and the improvement of use efficiency of the NAND flash memory 5 can be attempted.

In addition, the process data management table shown in FIG. 11 can also be used to select the moving target data in the first embodiment.

For example, if the total number of processes which is notified by the process monitor 41 of the host 2 exceeds a first threshold value or if the increase in total number of processes is notified by the process monitor 41 of the host 2, the controller 4 of the SSD 3 executes the processing of referring to the process data management table shown in FIG. 11, specifying the process in which more data are stored in the blocks having a low degree of multi-level, and moving the data accessed by the specified process (for example, data written to the NAND flash memory 5 by the specified process, or data read from or written to the NAND flash memory 5 by the specified process) from the blocks having a low degree of multi-level to the blocks having a higher degree of multi-level.

Alternatively, if the total number of processes notified by the process monitor 41 of the host 2 exceeds a first threshold value or if the increase in total number of processes is notified by the process monitor 41 of the host 2, the controller 4 of the SSD 3 may execute the processing of referring to the process data management table shown in FIG. 11, specifying the process of the oldest latest access time, and moving the data access by the specified process (for example, data written to the NAND flash memory 5 by the specified process or data read from or written to the NAND flash memory 5 by the specified process) from the blocks having a low degree of multi-level to the blocks having a higher degree of multi-level.

The flowchart of FIG. 12 shows a procedure of the data read/write processing executed by the host 2 and the SSD 3.

When the read/write request needs to be transmitted to the SSD 3 (YES in step S51), the process monitor 41 of the host 2 assigns the identifier of the process requiring data read/write to the read/write request (step S52), and transmits to the SSD 3 the read/write request to which the identifier of the process requiring data read/write is assigned (step S53).

The controller 4 of the SSD 3 receives the read/write request from the host 2 (step S61). The host request processing unit 402 instructs the data controlling unit 403 to read the data from the NAND flash memory 5 or to write the data to the NAND flash memory 5, based on the received read/write request, and the data controlling unit 403 executes reading the data from the NAND flash memory 5 or writing the data to the NAND flash memory 5 (step S62). Furthermore, the data controlling unit 403 stores the correspondence between the identifier of the process assigned to the read/write request and an address range (LBA region) of the data read or written by this process into the process data management table shown in FIG. 11 (step S63).

Figure 13:
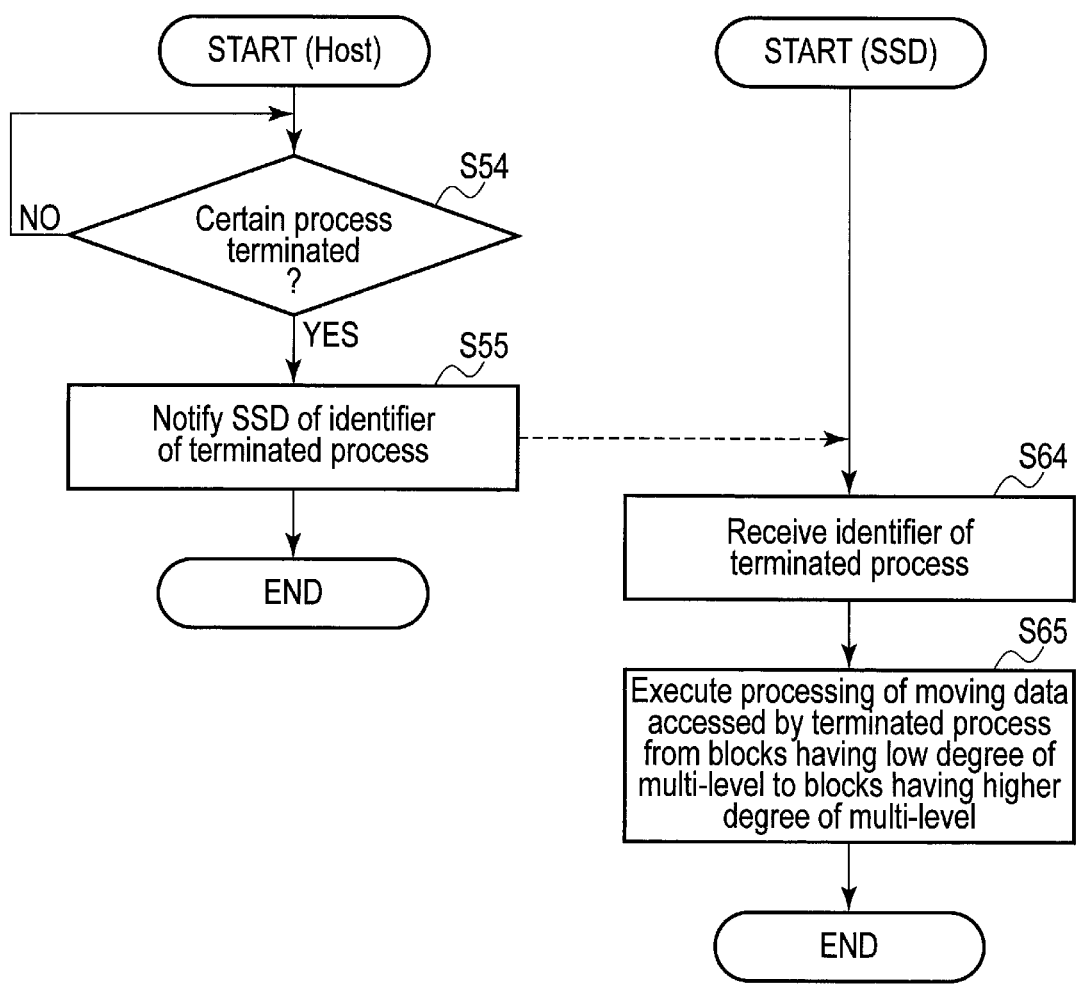
FIG. 13 is a flowchart showing a procedure of process identifier notice processing and data move processing, which are executed by the storage device of the second embodiment and the host in response to termination of a process.

The flowchart of FIG. 13 shows a procedure of process identifier notice processing and data move processing, which are executed by the storage device of the second embodiment and the host in response to termination of the process.

When a certain process is terminated (YES in step S54), the process monitor 41 of the host 2 notifies the SSD 3 of the identifier of the terminated process (step S55).

The controller 4 of the SSD 3 receives the identifier of the terminated process from the host 2 (step S64). The host request processing unit 402 instructs the data controlling unit 403 to move the data of the terminated process, and the data controlling unit 403 executes the processing of moving the data accessed by the terminated process (for example, data written to the NAND flash memory 5 by the terminated process or the data read from the NAND flash memory 5 or written to the NAND flash memory 5 by the terminated process) to the blocks having a higher degree of multi-level, based on the process data management table shown in FIG. 11 (step S65).

Figure 14:
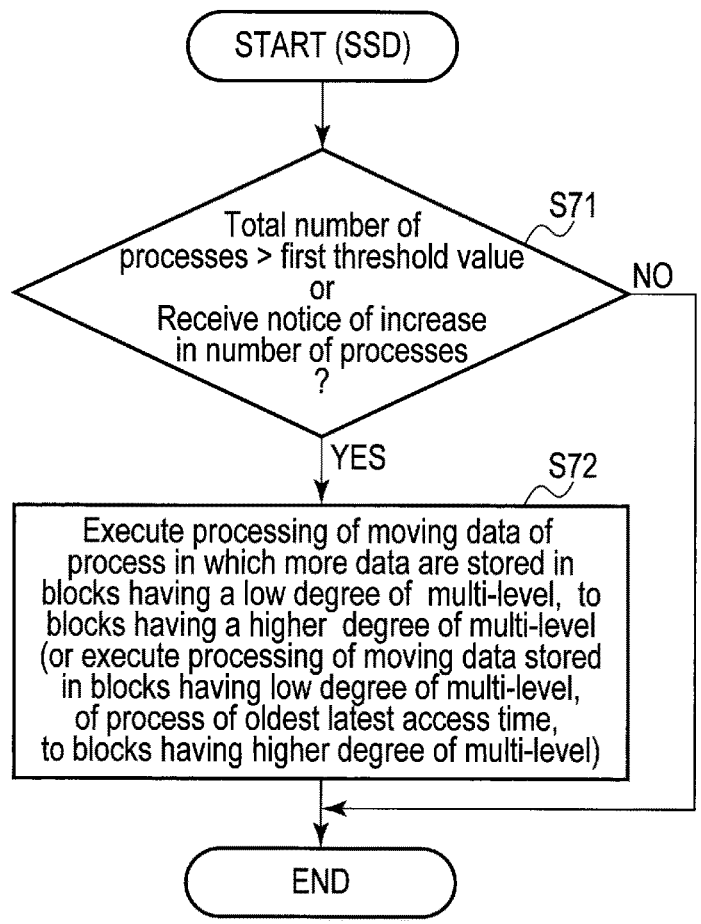
FIG. 14 is a flowchart showing a procedure of the data move processing executed by the storage device of the second embodiment in a case where the total number of processes exceeds a threshold value or where increase of the process number is received.

The flowchart of FIG. 14 shows a procedure of the data move processing executed by the SSD 3 in a case where the total number of processes exceeds a threshold value or where the increase in process number is received.

If the total number of processes notified by the host 2 exceeds a first threshold value or if the process monitor 41 of the host 2 notifies the host request processing unit 402 of the increase in total number of processes (YES in step S71), the host request processing unit 402 instructs the data controlling unit 403 to move the data. The data controlling unit 403 executes the processing of referring to the process data management table shown in FIG. 11, specifying the process in which more data are stored in the blocks having a low degree of multi-level, and moving the data accessed by the specified process (for example, data written to the NAND flash memory 5 by the specified process, or data read from or written to the NAND flash memory 5 by the specified process) from the blocks having a low degree of multi-level to the blocks having a higher degree of multi-level (step S72).

Alternatively, in step S72, the data controlling unit 403 may execute the processing of referring to the process data management table shown in FIG. 11, specifying the process wherein the latest access time is the oldest, and moving the data accessed by the specified process (for example, data written to the NAND flash memory 5 by the specified process or data read from or written to the NAND flash memory 5 by the specified process) from the blocks having a low degree of multi-level to the blocks having a higher degree of multi-level.

The processing explained with reference to the flowchart of FIG. 12, the flowchart of FIG. 13, and the flowchart of FIG. 14 is executed by the processor 12 configured to execute the host software (storage driver 31, operating system (OS) 32, file system 33, process monitor 41, and the like).

Third Embodiment

A configuration that a host 2 notifies an SSD 3 of an identifier of a created process and a type (process type) of the created process, which is indicative of a system process or a user process, and the SSD 3 executes processing of selecting data accessed by the user process (for example, data written to a NAND flash memory 5 by the user process, or data read from or written to the NAND flash memory 5 by the user process) as moving target data, in preference to data accessed by the system process (for example, data written to a NAND flash memory 5 by the system process, or data read from or written to the NAND flash memory 5 by the system process), will be hereinafter explained as third embodiment.

Hardware configuration of the SSD 3 and hardware configuration of the host 2 in the third embodiment are the same as those in the first embodiment, and inner configuration of the host 2 is the same as that explained with reference to FIG. 10.

In the first embodiment and the second embodiment, the process monitor 41 manages the states of the processes on the host 2, and the processes are classified into the user processes and system processes as explained above.

As explained above, swap out and swap in of processes often occur but, since the system processes are necessary for normal operations of the host 2, swap out of the system process rarely occurs. In other words, most of the processes subjected to swap out and swap in are user processes, and system processes are resident in the memory 13 of the host 2 in plural cases. Therefore, there is high possibility that a launched system process transmits a read/write request to the SSD 3.

Then, when notifying the SSD 3 of creation of the process, the process monitor 41 of the host 2 notifies the SSD 3 of not only the identifier of the created process, but also the type of the created process, which is indicative of the system process or the user process.

The data controlling unit 403 of the SSD 3 manages correspondence among the identifier of each of the created processes, the type of each of the created processes, an address range (LBA region) corresponding to the data accessed by each of the created processes (for example, data written to the NAND flash memory 5 by the created process, or data read from or written to the NAND flash memory 5 by the created process), and the like, by using the process data management table shown in FIG. 11. Then, when determining which process's data is to be moved to the blocks having a higher degree of multi-level, the data controlling unit 403 selects the data accessed by the process whose type is the user process in preference to the data accessed by the process whose type is the system process. Thus, since the data of the user process can be moved to the blocks having a higher degree of multi-level in preference to the data of the system process which may be accessed with high probability, the performance of the SSD 3 seen from the host 2 and the performance of the SSD 3 seen from the user can be improved.

Figure 15:
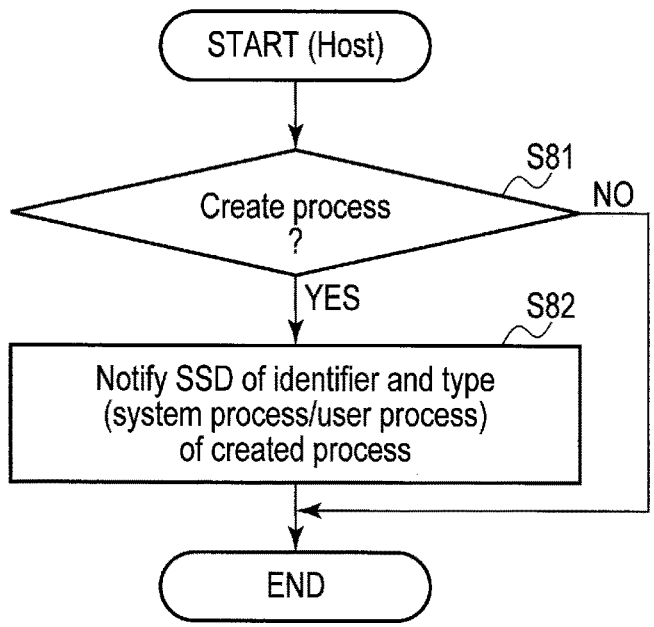
FIG. 15 is a flowchart showing a procedure of processing for notifying the storage device of a type of a created process, the processing for notifying being executed by the host.

The flowchart of FIG. 15 shows a procedure of processing for notifying the SSD 3 of a type of a created process (user process/system process), which is executed by the host 2.

If the process monitor 41 of the host 2 detects that a new process has been created in the host 2 (YES in step S81), the process monitor 41 notifies the SSD 3 of an identifier of the created process and a type of the created process (step S82).

The flowchart of FIG. 16 shows a procedure of the process number increase/decrease notice processing and the data move processing, which are executed by the host 2 and the SSD 3.

The process monitor 41 of the host 2 cooperates with the process manager 321 to manage the increase and decrease in total number of processes running on the processor 12 of the host 2 (step S91).

If the total number of processes is increased (YES in step S92), the process monitor 41 transmits the notice indicative of the increase in the total number of processes to the SSD 3 (step S93).

In contrast, if the total number of processes is decreased (YES in step S94), the process monitor 41 transmits the notice indicative of the decrease in the total number of processes to the SSD 3 (step S95).

If the controller 4 of the SSD 3 receives the notice indicative of the increase in the total number of processes from the host 2 (YES in step S101), the host request processing unit 402 executes the processing of moving the data stored in the blocks having a low degree of multi-level to the blocks having a higher degree of multi-level, by using the data controlling unit 403 (step S102). In step S102, the host request processing unit 402 instructs the data controlling unit 403 to move the data, and the data controlling unit 403 selects data accessed by the user process (for example, data written to a NAND flash memory 5 by the user process, or data read from or written to the NAND flash memory 5 by the user process) as the moving target data, in preference to data accessed by the system process (for example, data written to a NAND flash memory 5 by the system process, or data read from or written to the NAND flash memory 5 by the system process), based on the process data management table shown in FIG. 11, and moves the selected data from the blocks having a low degree of multi-level to the blocks having a higher degree of multi-level.

Therefore, before swap out occurs, the free blocks for SLC can be preliminarily reserved, and the time required for swap out can be reduced. As a result, the performance of the whole computer system 1 can be improved.

If the controller 4 of the SSD 3 receives the notice indicative of the decrease in the total number of processes from the host 2 (YES in step S103), the host request processing unit 402 executes the processing of moving the data stored in the blocks having a low degree of multi-level to the blocks having a higher degree of multi-level, by using the data controlling unit 403 (step S104). In step S104, the host request processing unit 402 instructs the data controlling unit 403 to move the data, and the data controlling unit 403 selects data accessed by the user process (for example, data written to a NAND flash memory 5 by the user process, or data read from or written to the NAND flash memory 5 by the user process) as moving target data, in preference to data accessed by the system process (for example, data written to a NAND flash memory 5 by the system process, or data read from or written to the NAND flash memory 5 by the system process), based on the process data management table shown in FIG. 11, and moves the selected data from the blocks having a low degree of multi-level to the blocks having a higher degree of multi-level. The use efficiency of the NAND flash memory 5 is improved because of the data movement.

In step S102, the data stored in the blocks having a low degree of multi-level is moved to the blocks having a higher degree of multi-level but, for example, the data (valid data) accessed by the user process may be moved between the TLC blocks. As explained above, this data movement is one type of GC. In this case, too, the embodiment can prepare for future swap out by allocating the free blocks created by the data movement as the free blocks for SLC.

Similarly, in step S104, too, for example, the data (valid data) of the user process may be moved between the TLC blocks.

Figure 17:
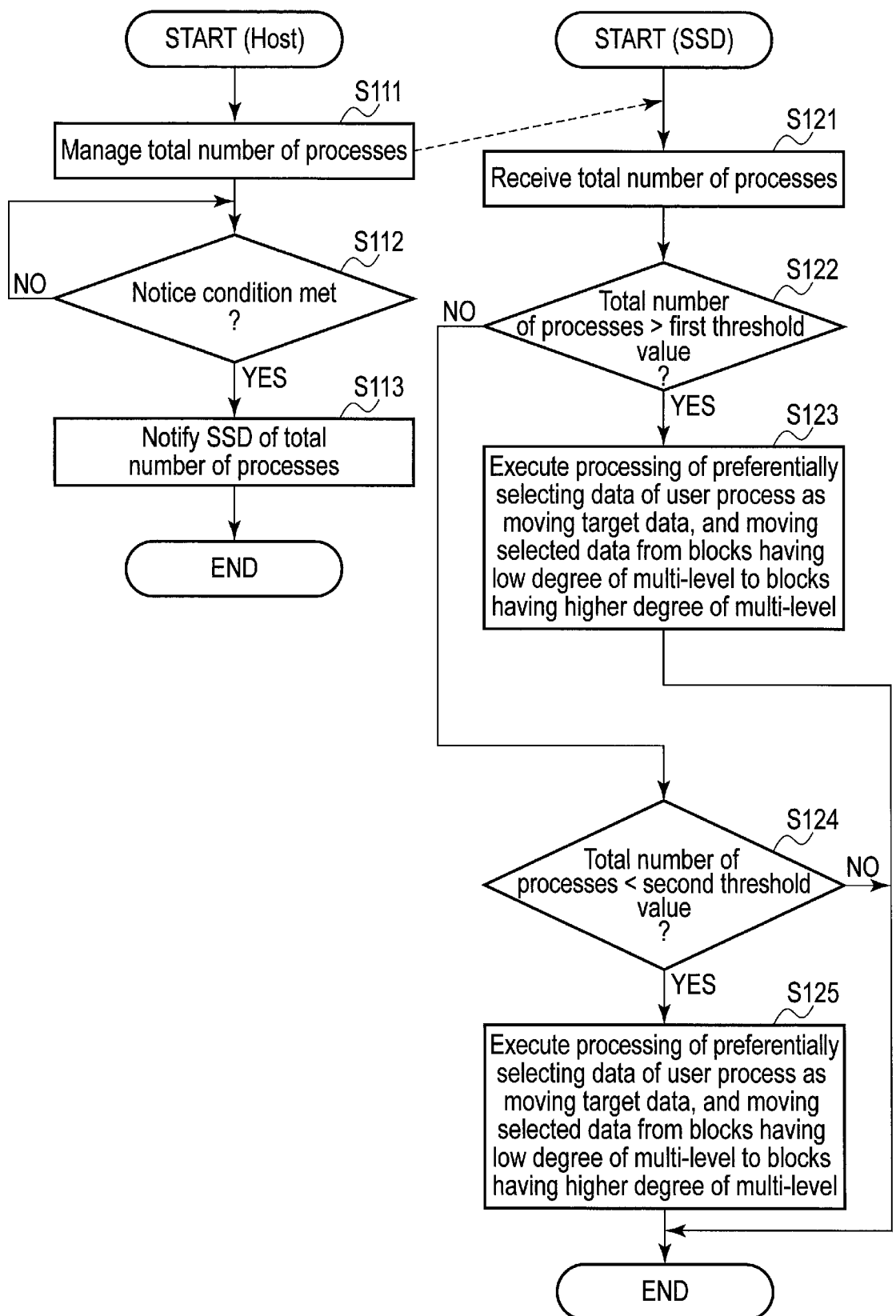
FIG. 17 is a flowchart showing a procedure of total process number notice processing and data move processing, which are executed by the host and the storage device of the third embodiment.

The flowchart of FIG. 17 shows a procedure of the total number of processes notice processing and the data move processing, which are executed by the host 2 and the SSD 3.

The process monitor 41 of the host 2 cooperates with the process manager 321 to manage the total number of processes running on the processor 12 of the host 2 (step S111). If the notice condition that the total number of processes is increased or decreased or that a certain period has passed after the previous notice is met (YES in step S112), the process monitor 41 transmits the information indicative of the total number of processes to the SSD 3 and notifies the SSD 3 of the total number of processes (step S113).

The controller 4 of the SSD 3 receives the notice indicative of the total number of processes from the host 2 (step S121). The host request processing unit 402 of the controller 4 compares the total number of processes which is notified by the host 2 with the first threshold value, and determines whether the total number of processes exceeds the first threshold value or not (step S122).

If the total number of processes exceeds the first threshold value (YES in step S122), the host request processing unit 402 executes the processing of moving the data stored in the blocks having a low degree of multi-level to the blocks having a higher degree of multi-level, by using the data controlling unit 403 (step S123). In step S123, the host request processing unit 402 instructs the data controlling unit 403 to move the data. Then, the data controlling unit 403 selects data accessed by the user process (for example, data written to a NAND flash memory 5 by the user process, or data read from or written to the NAND flash memory 5 by the user process) as moving target data, in preference to data accessed by the system process (for example, data written to a NAND flash memory 5 by the system process, or data read from or written to the NAND flash memory 5 by the system process), based on the process data management table shown in FIG. 11, and moves the selected data from the blocks having a low degree of multi-level to the blocks having a higher degree of multi-level.

Therefore, before swap out occurs, the free blocks for SLC can be preliminarily reserved, and the time required for swap out can be reduced. As a result, the performance of the whole computer system 1 can be improved.

If the total number of processes does not exceed the first threshold value (NO in step S122), the host request processing unit 402 compares the total number of processes with the second threshold value (<first threshold value), and determines whether the total number of processes is below the second threshold value or not (step S124).

If the total number of processes is below the second threshold value (YES in step S124), the host request processing unit 402 executes the processing of moving the data stored in the blocks having a low degree of multi-level to the blocks having a higher degree of multi-level, by using the data controlling unit 403 (step S125). In step S125, the host request processing unit 402 instructs the data controlling unit 403 to move the data. Then, the data controlling unit 403 selects data accessed by the user process (for example, data written to a NAND flash memory 5 by the user process, or data read from or written to the NAND flash memory 5 by the user process) as moving target data, in preference to data accessed by the system process (for example, data written to a NAND flash memory 5 by the system process, or data read from or written to the NAND flash memory 5 by the system process), based on the process data management table shown in FIG. 11, and moves the selected data from the blocks having a low degree of multi-level to the blocks having a higher degree of multi-level. The use efficiency of the NAND flash memory 5 is improved because of the data movement.

In step S123, the data stored in the blocks having a low degree of multi-level is moved to the blocks having a higher degree of multi-level but, for example, the data (valid data) accessed by the user process may be moved between the TLC blocks. As explained above, this data movement is one type of GC. In this case, too, the embodiment can prepare for future swap out by allocating the free blocks created by the data movement as the free blocks for SLC.

Similarly, in step S125, too, for example, the data (valid data) of the user process may be moved between the TLC blocks.

In addition, if the host 2 notifies the SSD 3 of termination of the plural processes, the controller 4 of the SSD 3 may select the data accessed by the terminated process whose type is the user process, of the terminated plural processes, as the moving target data, in preference to the data accessed by the terminated process whose type is the system process.

Figure 18:
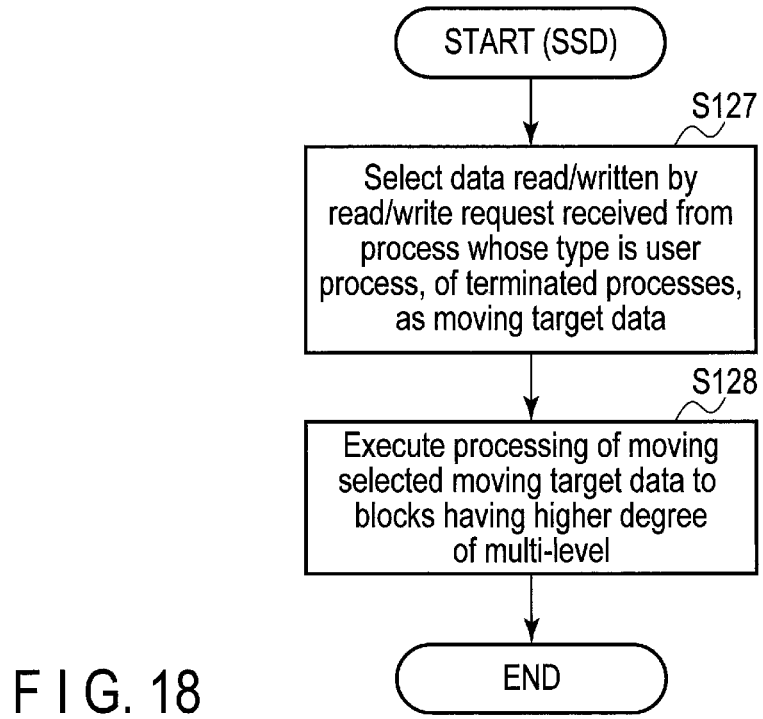
FIG. 18 is a flowchart showing a procedure of processing of preferentially moving data of a user process, of the terminated processes executed by the storage device of the third embodiment.

In this case, a procedure shown in the flowchart of FIG. 18 is executed by the controller 4 of the SSD 3.

If the host 2 notifies the SSD 3 of the termination of plural processes, the host request processing unit 402 of the controller 4 of the SSD 3 instructs the data controlling unit 403 to move the data. The data controlling unit 403 selects the data accessed by the process whose type is the user process (for example, data written to the NAND flash memory 5 by the user process, or data read from or written to the NAND flash memory 5 by the user process), of the terminated processes, as the moving target data, in preference to the data of the system process, based on the process data management table shown in FIG. 11 (step S127).

Then, the data controlling unit 403 executes processing of moving the selected data to blocks having a high degree of multi-level (step S128).

The processing explained with reference to the flowchart of FIG. 15, the flowchart of FIG. 16, the flowchart of FIG. 17, and the flowchart of FIG. 18 is executed by the processor 12 configured to execute the host software (storage driver 31, operating system (OS) 32, file system 33, process monitor 41, and the like).

Fourth Embodiment

In fourth embodiment, a host 2 notifies the SSD 3 of a usage of a memory 13 of the host 2. If the usage of the memory 13 exceeds a third threshold value, a controller 4 of the SSD 3 executes data movement in preparation for swap out. This data movement is one type of GC.

In addition, when the usage of the memory 13 is below a fourth threshold value smaller than the third threshold value, a controller 4 of the SSD 3 also executes data movement. This data movement is also one type of GC. When the usage of the memory 13 is small, the amount of data write from the host 2 is comparatively small since swap out hardly occurs. Therefore, when the usage of the memory 13 is small, for example, free blocks of SLC can be preliminarily increased without lowering the data write performance of the SSD 3 seen from the host 2, by moving the data.

The usage of the memory 13 of the host 2 may be represented by the total usage of the memory 13 or a rate of the total usage of the memory 13 to a total memory size of the memory 13.

In addition, hardware configuration of the SSD 3 and hardware configuration of the host 2 in the fourth embodiment are the same as those in the first embodiment, and inner configuration of the host 2 is the same as that explained with reference to FIG. 10.

As explained above, the process monitor 41 of the host 2 recognizes the size of the memory region allocated to each of the processes running on the host 2. Then, the process monitor 41 notifies the SSD 3 of the usage of the memory 13 of the host 2 (i.e., the total usage of the memory 13 or the rate of the total usage of the memory 13 to the total memory size of the memory 13). The SSD 3 receives information indicative of the usage of the memory 13 of the host 2 and executes the following processing.

If the usage of the memory 13 of the host 2 is more than the third threshold value, the controller 4 of the SSD 3 moves the data stored in blocks having a low degree of multi-level to blocks having a higher degree of multi-level. Increase in memory usage of the host 2 is indicative of higher possibility that swap out of process may occur in near future. Therefore, swap out of process and swap in of process can be executed in a shorter time by preliminarily creating the free blocks for a low degree of multi-level. Thus, the performance of the SSD 3 seen from the host 2 and the performance of the SSD 3 seen from the user can be more improved.

In addition, if the usage of the memory 13 of the host 2 is less than a fourth threshold value which is smaller than the third threshold value, the controller 4 of the SSD 3 moves the data stored in the blocks having a low degree of multi-level to the blocks having a higher degree of multi-level. Decrease in memory usage of the host 2 is indicative of higher possibility that the number of accesses to the SSD 3 will be small in near future. Therefore, the use efficiency of the NAND flash memory 5 can be improved by creating free blocks having a low degree of multi-level.

Determining which process's data are to be used for movement to create the free blocks can be executed in the same method as that of each of embodiments explained above.

Figure 19:
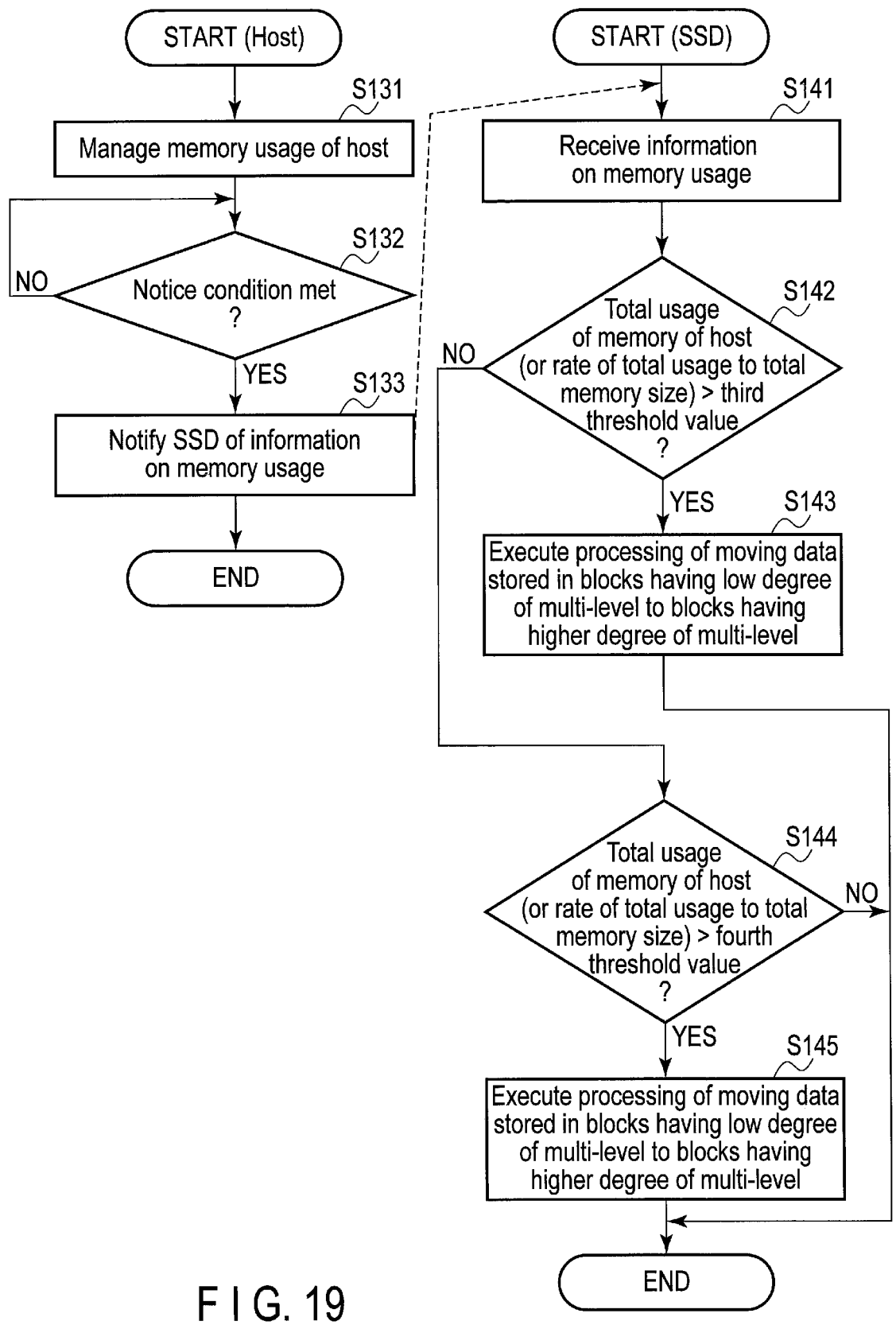
FIG. 19 is a flowchart showing a procedure of memory usage notice processing and data move processing, which are executed by the host and a storage device of fourth embodiment.

The flowchart of FIG. 19 shows a procedure of the used memory amount notice processing and the data move processing, which are executed by the host 2 and the SSD 3.

The process monitor 41 of the host 2 cooperates with the process manager 321 to manage a usage of the memory 13 of the host 2 (i.e., a total usage of the memory 13 or a rate of the total usage of the memory 13 to a total memory size of the memory 13) (step S131). When the notice condition that the usage of the memory 13 is increased or decreased, or a certain period has passed since the previous notice is met (YES in step S132), the process monitor 41 transmits the information indicative of the usage of the memory 13 of the host 2 (i.e., the total usage of the memory 13 or the rate of the total usage of the memory 13 to the total memory size of the memory 13) and notifies the SSD 3 of the usage of the memory 13 of the host 2 (step S133).

The controller 4 of the SSD 3 receives the usage of the memory 13 of the host 2 (i.e., the total usage of the memory 13 or the rate of the total usage of the memory 13 to the total memory size of the memory 13) from the host 2 (step S141). The host request processing unit 402 of the controller 4 compares the usage of the memory 13 notified by the host 2 (i.e., the total usage of the memory 13, or the rate of the total usage of the memory 13 to the total memory size of the memory 13) with a third threshold value, and determines whether the usage of the memory 13 (i.e., the total usage of the memory 13, or the rate of the total usage of the memory 13 to the total memory size of the memory 13) exceeds the third threshold value or not (step S142).

If the usage of the memory 13 (i.e., the total usage of the memory 13, or the rate of the total usage of the memory 13 to the total memory size of the memory 13) exceeds the third threshold value (YES in step S142), the host request processing unit 402 executes the processing of moving the data stored in the blocks having a low degree of multi-level to the blocks having a higher degree of multi-level, by using the data controlling unit 403 (step S143). In step S143, the host request processing unit 402 instructs the data controlling unit 403 to move the data. The data controlling unit 403 moves the data from the blocks having a low degree of multi-level to the blocks having a higher degree of multi-level.

If the usage of the memory 13 (i.e., the total usage of the memory 13, or the rate of the total usage of the memory 13 to the total memory size of the memory 13) does not exceed the third threshold value (NO in step S142), the host request processing unit 402 compares the usage of the memory 13 (i.e., the total usage of the memory 13, or the rate of the total usage of the memory 13 to the total memory size of the memory 13) with a fourth threshold value (<third threshold value), and determines whether the usage of the memory 13 (i.e., the total usage of the memory 13, or the rate of the total usage of the memory 13 to the total memory size of the memory 13) falls below the fourth threshold value or not (step S144).

If the usage of the memory 13 (i.e., the total usage of the memory 13, or the rate of the total usage of the memory 13 to the total memory size of the memory 13) falls below the fourth threshold value (YES in step S144), the host request processing unit 402 executes the processing of moving the data stored in the blocks having a low degree of multi-level to the blocks having a higher degree of multi-level, by using the data controlling unit 403 (step S145). In step S145, the host request processing unit 402 instructs the data controlling unit 403 to move the data. The data controlling unit 403 moves the data from the blocks having a low degree of multi-level to the blocks having a higher degree of multi-level.

In step S143, processing (i.e., one type of GC) of moving the data stored in the blocks having a low degree of multi-level to the blocks having a higher degree of multi-level is executed but, for example, processing of moving the data (valid data) between the TLC blocks may be executed. In this case, too, the embodiment can prepare for future swap out by allocating the free blocks created by the data movement as the free blocks for SLC.

Similarly, in step S145, too, for example, the processing of moving the data (valid data) between the TLC blocks may be executed.

The processing explained with reference to the flowchart of FIG. 19 is executed by the processor 12 configured to execute the host software (storage driver 31, operating system (OS) 32, file system 33, process monitor 41, and the like).

Fifth Embodiment

In fifth embodiment, a host 2 notifies an SSD 3 of information indicative of a data amount to be written to the SSD 3 by swap out which occurs next. If usage of a memory 13 exceeds a third threshold value, the controller 4 of the SSD 3 executes processing of moving data stored in blocks having a low degree of multi-level to blocks having a higher degree of multi-level, such that free space corresponding to the data amount notified by the host 2 is reserved in the blocks having a low degree of multi-level.

A process monitor 41 of the host 2 can recognize a target process for swap out which occurs next in the host 2. The target process for swap out is, for example, a process where the latest launch time is old, or a process where the allocated memory size is largest. Therefore, the process monitor 41 can predict the data amount to be written to the SSD 3 by swap out which occurs next. Thus, the process monitor 41 notifies the SSD 3 of the data amount predicted to be written to the SSD 3 by swap out which occurs next.

When the controller of the SSD 3 receives the notice, the controller moves the data so as to create free space corresponding to the notified data amount in the blocks having a low degree of multi-level. As a result, the time spent for swap out can be reduced and the performance of the SSD 3 seen from the host 2 and the performance of the SSD 3 seen from the user can be further improved.

Determining which process's data are to be used for movement can be executed in the same method as that of each embodiment explained above.

Figure 20:
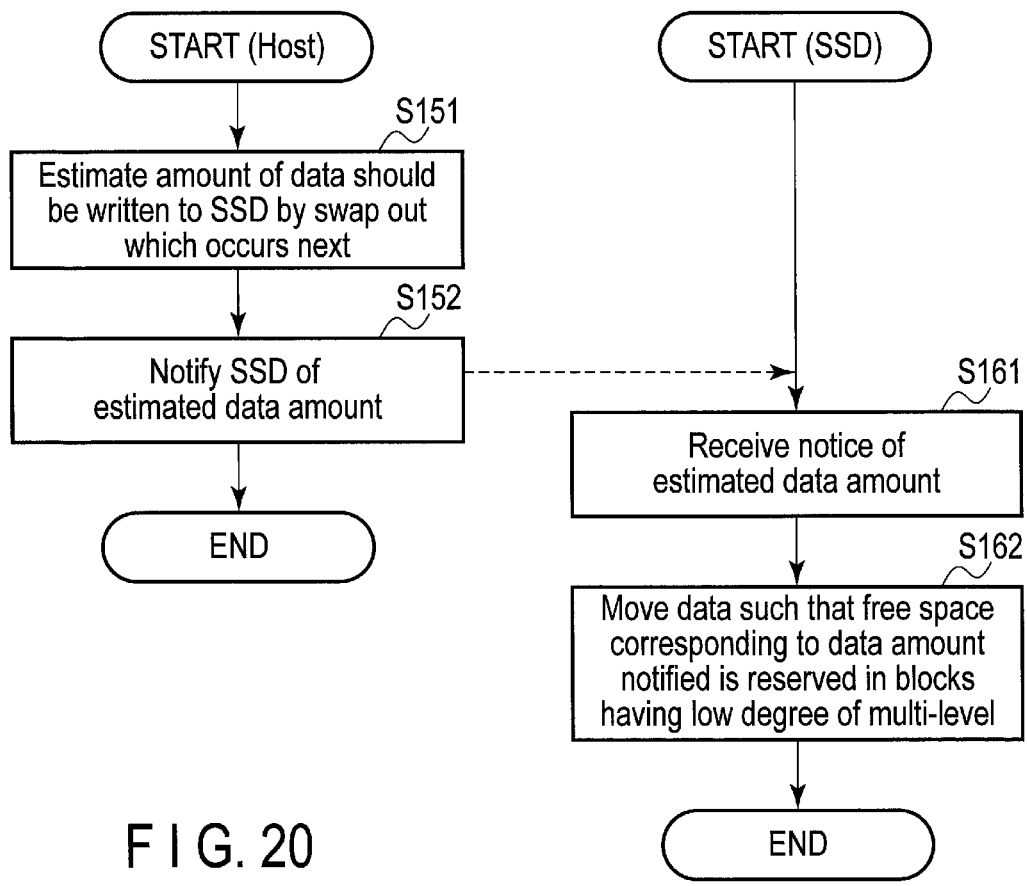
FIG. 20 is a flowchart showing a procedure of processing for notifying a data amount written to a storage device by swap out and data move processing, which are executed by the host and a storage device of fifth embodiment.

The flowchart of FIG. 20 shows a procedure of the processing of notifying the SSD 3 of the data amount to be written to the SSD 3 by swap out and the data move processing, which are executed by the host 2 and the SSD 3.

The process monitor 41 of the host 2 estimates the data amount to be written to the SSD 3 by swap out which occurs next (step S151). The process monitor 41 transmits information indicative of the estimated data amount to the SSD 3 and notifies the SSD 3 of the estimated data amount (step S152).

The controller 4 of the SSD 3 receives the notice indicative of the estimated data amount from the host 2 (step S161). A host request processing unit 402 of a controller 4 instructs the data controlling unit 403 to move data stored in blocks having a low degree of multi-level to blocks having a higher degree of multi-level, such that free space corresponding to the estimated data amount is reserved in the blocks having a low degree of multi-level. The data controlling unit 403 receiving this instruction executes processing of moving the data stored in blocks having a low degree of multi-level to blocks having a higher degree of multi-level, such that free space corresponding to the estimated data amount is reserved in the blocks having a low degree of multi-level (step S162).

In step S162, the data stored in the blocks having a low degree of multi-level is moved to the blocks having a higher degree of multi-level but, for example, the data (valid data) may be moved between the TLC blocks. As explained above, this data movement is one type of GC. In this case, too, the embodiment can prepare for future swap out by allocating the free blocks created by the data movement as the free blocks for SLC.

The flowchart of FIG. 21 shows a procedure of the processing of notifying the SSD 3 of the used memory amount and the data amount written to the SSD 3 by swap out and the data move processing, which are executed by the host 2 and the SSD 3.

The process monitor 41 of the host 2 cooperates with the process manager 321 to manage a usage of the memory 13 of the host 2 (i.e., a total usage of the memory 13 or a rate of the total usage of the memory 13 to a total memory size of the memory 13). The process monitor 41 notifies the SSD 3 of information indicative of the usage of the memory 13 of the host 2 and the estimated data amount to be written to the SSD 3 by swap out which occurs next (step S153).

The controller 4 of the SSD 3 receives from the host 2 the usage of the memory 13 of the host 2 (i.e., the total usage of the memory 13 or the rate of the total usage of the memory 13 to the total memory size of the memory 13) and an estimated data amount to be written to the SSD 3 at swap out which occurs next (step S163).

The host request processing unit 402 of the controller 4 compares the usage of the memory 13 notified by the host 2 (i.e., the total usage of the memory 13, or the rate of the total usage of the memory 13 to the total memory size of the memory 13) with a third threshold value, and determines whether the usage of the memory 13 (i.e., the total usage of the memory 13, or the rate of the total usage of the memory 13 to the total memory size of the memory 13) exceeds the third threshold value or not (step S164).

If the usage of the memory 13 (i.e., the total usage of the memory 13, or the rate of the total usage of the memory 13 to the total memory size of the memory 13) exceeds the third threshold value (YES in step S164), the host request processing unit 402 instructs the data controlling unit 403 to move the data stored in the blocks having a low degree of multi-level to the blocks having a higher degree of multi-level, such that free space corresponding to the estimated data amount notified is reserved in the blocks having a low degree of multi-level. The data controlling unit 403 receiving this instruction executes processing of moving the data stored in blocks having a low degree of multi-level to blocks having a higher degree of multi-level, such that free space corresponding to the estimated data amount is reserved in the blocks having a low degree of multi-level (step S165).

In step S165, the data stored in the blocks having a low degree of multi-level is moved to the blocks having a higher degree of multi-level but, for example, the data (valid data) may be moved between the TLC blocks. As explained above, this data movement is one type of GC. In this case, too, the embodiment can prepare for future swap out by allocating the free blocks created by the data movement as the free blocks for SLC.

In addition, the processing of notifying the SSD 3 of the data amount to be written from the host 2 to the SSD 3 by swap out which occurs net, by the host 2 may be employed in not only the fourth embodiment, but also the first embodiment, the second embodiment, and the third embodiment. For example, if the processing of notifying the SSD 3 of the data amount written from the host 2 to the SSD 3 by swap out, by the host 2, is applied to the first embodiment, the controller 4 of the SSD 3 may move the data stored in blocks having a low degree of multi-level to blocks having a higher degree of multi-level, such that free space corresponding to the data amount notified is reserved in the blocks having a low degree of multi-level, after determining that the total number of processes exceeds a first threshold value.

In addition, the processing of the host 2 explained with reference to the flowchart of FIG. 20 and flowchart of FIG. 21 is executed by the processor 12 configured to execute the host software (storage driver 31, operating system (OS) 32, file system 33, process monitor 41, and the like).

Sixth Embodiment

In sixth embodiment, a process monitor 41 of a host 2 manages frequency with which each of the programs is launched and a list of the programs. The process monitor 41 notifies the SSD 3 of information indicative of a program of a high launch frequency (i.e., a frequently launched program). The launch frequency of a certain program can be represented by, for example, the number of times the program is launched within a certain reference period, the number of times the program is launched in a period from boot of OS 32 of the host 2 to shutdown of OS 32, or the like. A program in which the number of times it is launched within the referential period (or the number of times it is launched in a period from boot of the OS 32 to shutdown of the OS 32) exceeds a certain threshold value may be detected as a program of a high launch frequency.

A controller 4 of the SSD 3 executes processing of moving data read or written by the process corresponding to the program of high launch frequency of which the host 2 notifies the SSD 3, from blocks having a high degree of multi-level to blocks having a lower degree of multi-level. Thus, the time required to launch this program can be reduced and this program can be launched at a high speed.

The timing of executing the processing of moving the data of the program having a high launch frequency to the blocks having a lower degree of multi-level is not limited to this but, for example, the processing may be executed (i) after determining that the total number of processes notified by the host 2 falls below the second threshold value, or (ii) after the host 2 notifies the SSD 3 of the decrease in the total number of processes, or (iii) after determining that the usage of the host memory falls below the fourth threshold value.

In addition, the controller 4 of the SSD 3 may preferentially select the data of the program having a low launch frequency as the moving target data, when moving the data of the blocks having a low degree of multi-level to the blocks having a higher degree of multi-level.

Hardware configuration of the SSD 3 and hardware configuration of the host 2 in the sixth embodiment are the same as those in the first embodiment, and inner configuration of the host 2 is the same as that explained with reference to FIG. 10.

The data move processing of the sixth embodiment will be hereinafter explained in detail.

As explained above, the process monitor 41 of the host 2 manages that each process running on the host 2 corresponds to which program. The launch and termination of the program is repeated, the process is created for each launch of the program, and the process is discarded (deleted) for each termination of the program.

Each time the process is created, different numerical values are assigned to the process ID, of identifiers of the process, but the corresponding program, for example, program name is the same. Therefore, the process monitor 41 can recognize the frequently launched program by recording which program corresponds to the created process. Then, the process monitor 41 notifies the SSD 3 of the frequently launched program, i.e., the program of a high launch frequency.

The controller 4 of the SSD 3 manages correspondence between an identifier of each of created processes and an address range corresponding to the data read or written by each of the created processes or the like, by using a process data management table shown in FIG. 11. Furthermore, the controller 4 of the SSD 3 records the program corresponding to each process identifier, on the process data management table shown in FIG. 11. Then, the controller 4 selects data accessed (read or written) by a process corresponding to the frequently launched program notified by the process monitor 41, as data for movement, and urges the data for movement to be moved from the blocks having a high degree of multi-level to the blocks having a low degree of multi-level. Thus, the data of the program frequently launched by the user or system can be collected to the blocks having a low degree of multi-level, and the performance of the SSD 3 seen from the host 2 and the performance of the SSD 3 seen from the user can be improved.

In addition, when selecting the process for data move processing as explained in each of the other embodiments, the controller 4 may not select the frequently launched program notified by the process monitor 41, as data for movement which are to be moved from the blocks having a low degree of multi-level to the blocks having a higher degree of multi-level. For example, after determining that the total number of processes running on the host 2 exceeds the first threshold value or determining that the usage of the memory 13 of the host 2 exceeds the fourth threshold value, the controller 4 may select the process from which the data is to be moved, of the processes corresponding to the other programs of a high launch frequency, which are notified by the host 2, and may urge the data read or written by the selected process to be moved from the blocks having a low degree of multi-level to the blocks having a higher degree of multi-level, based on the process data management table shown in FIG. 11.

Thus, since the data of the program frequently launched by the user or system is maintained in the state of being recorded in the blocks having a low degree of multi-level, the performance of the SSD 3 seen from the host 2 and the performance of the SSD 3 seen from the user can be improved.

The flowchart of FIG. 22 shows steps of the processing of notifying a frequently launched program and the data move processing, which are executed by the host 2 and the SSD 3.

The process monitor 41 of the host 2 detects a frequently launched program (step S171). The process monitor 41 transmits information indicative of the detected program, i.e., the program of a high launch frequency to the SSD 3 and notifies the SSD 3 of the program of a high launch frequency (step S172).

The controller 4 of the SSD 3 receives information indicative of a program of a high launch frequency from the host 2. Then, the host request processing unit 402 of the controller 4 instructs the data controlling unit 403 to move the data accessed by the program having a high degree of multi-level to the block having a lower degree of multi-level. The data controlling unit 403 receiving the instruction executes processing of moving data read or written by the process corresponding to the program of high launch frequency of which the host 2 notifies the SSD 3, from blocks having a high degree of multi-level to blocks having a lower degree of multi-level, based on the process data management table shown in FIG. 11 (step S173).

The processing explained with reference to the flowchart of FIG. 22 is executed by the processor 12 configured to execute the host software (storage driver 31, operating system (OS) 32, file system 33, process monitor 41, and the like).

As explained above, according to the first to sixth embodiments, the host 2 notifies the SSD 3 of the information on the inner state of the host 2 (i.e., the total number of processes, the increase or decrease in total number of processes, the identifier of each of created processes, the type of each of created processes, identifier of the terminated process, the read/write requests to which identifiers of processes of request sources are assigned, usage of the host memory, the data amount written to the SSD 3 by swap out which occurs next, the frequently launched program, and the like), and the inner operations of the SSD 3 such as data movement between the blocks different in value of multi-level and data movement for GC are controlled based on the information.

Thus, the performance of the SSD 3 seen from the host 2 and the performance of the SSD 3 seen from the user can be improved by using the state change of the host 2 to control inside the SSD 3. In addition, the use efficiency of the NAND flash memory 5 inside the SSD 3 can be improved.

The processing of notifying the inner state of the host 2 and the data move processing based on the inner state notified by the host 2 are explained separately in the first to sixth embodiments, but the processing of the embodiments can be combined arbitrarily. In addition, a configuration including the configurations of arbitrary two or more embodiments of the first to sixth embodiments may be employed.

In addition, the notice of the state of the host 2 for the SSD 3 may be executed in a method conforming to various standards or a method other than the standards. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device connectable to a host, comprising:
a nonvolatile memory including a plurality of blocks; and
a controller electrically connected to the nonvolatile memory and configured to control the nonvolatile memory, wherein
the controller is configured to:
receive from the host information indicative of the total number of processes running on the host, the total number of processes being obtained by the host; and
execute processing of moving data stored in at least one block of the nonvolatile memory to at least one block of the other blocks of the nonvolatile memory, after determining that the total number of processes exceeds a first threshold value.

2. The storage device of claim 1, wherein
each of the blocks of the nonvolatile memory is selectively used as any one of plural types of blocks different in degree of multi-level indicative of the number of bits stored in one memory cell, and
the controller is configured to execute processing of moving data stored in a block having a low degree of multi-level to a block having a higher degree of multi-level, after determining that the total number of processes exceeds the first threshold value.

3. The storage device of claim 1, wherein
the controller is configured to:
receive, from the host, (i) information indicative of an identifier of each of processes created by the host and a type indicating whether each of the created processes is a system process or a user process, and (ii) write requests to which identifiers of processes requesting data write are assigned respectively;
manage correspondence between the identifier of each of the created processes, the type of each of the created processes, and an address range corresponding to data written by each of the created processes, by using a first management table; and
select data written to the nonvolatile memory by the process whose type is the user process, as moving target data, in preference to data written to the nonvolatile memory by the process whose type is the system process, and move the moving target data from a block where the moving target data is stored to another block, based on the first management table, after determining that the total number of processes exceeds the first threshold value.

4. The storage device of claim 3, wherein
each of the blocks of the nonvolatile memory is selectively used as any one of plural types of blocks different in degree of multi-level indicative of number of bits stored in one memory cell, and
the controller is configured to execute processing of moving the moving target data from the block where the moving target data is stored to a block whose the degree of multi-level is higher than that of the block where the moving target data is stored.

5. A storage device connectable to a host, the host comprising a processor and a memory, the storage device comprising:
a nonvolatile memory including a plurality of blocks; and
a controller electrically connected to the nonvolatile memory and configured to control the nonvolatile memory, wherein
the controller is configured to:
receive from the host information indicative of a usage of the memory of the host, the usage of the memory of the host being obtained by the host, the usage of the memory of the host indicating (i) a total usage of the memory of the host or (ii) a rate of the total usage of the memory of the host to a total memory size of the memory of the host; and
execute processing of moving data stored in at least one block of the nonvolatile memory to at least one block of the other blocks of the nonvolatile memory, after determining that the usage of the memory of the host exceeds a third threshold value.

6. The storage device of claim 5, wherein
each of the blocks of the nonvolatile memory is selectively used as any one of plural types of blocks different in degree of multi-level indicative of the number of bits stored in one memory cell, and
the controller is configured to execute processing of moving data stored in a block having a low degree of multi-level to another block having a higher degree of multi-level, after determining that the usage of the memory of the host exceeds the third threshold value.

7. The storage device of claim 5, wherein
the controller is configured to:
receive from the host information indicative of a data amount written to the storage device by swap out of a process which occurs next, the data amount being estimated by the host, the data amount corresponding an amount of data stored in a first memory region of the memory of the host, the first memory region being a memory region allocated to a target process for the swap out; and execute processing of moving data stored in at least one block of the nonvolatile memory to at least one block of the other blocks of the nonvolatile memory so as to reserve free space corresponding to the data amount indicated by the received information, after determining that the usage of the memory of the host exceeds the third threshold value.

8. The storage device of claim 5, wherein each of the blocks of the nonvolatile memory is selectively used as any one of plural types of blocks different in degree of multi-level indicative of the number of bits stored in one memory cell, and the controller is configured to:

receive from the host information indicative of a data amount written to the storage device by swap out of a process which occurs next, the data amount being estimated by the host, the data amount corresponding an amount of data stored in a first memory region of the memory of the host, the first memory region being a memory region allocated to a target process for the swap out; and execute processing of moving data stored in a block having a low degree of multi-level to a block having a higher degree of multi-level so as to reserve free space corresponding to the data amount indicated by the received information in a block having a low degree of multi-level, after determining that the usage of the memory of the host exceeds the third threshold value.

9. A computer system comprising a computer and a storage device, the computer comprising a processor and a memory, the processor being configured to obtain a total number of processes running on the processor and execute processing of notifying the storage device of the total number of processes running on the processor, the storage device comprising:

a nonvolatile memory including a plurality of blocks; and a controller electrically connected to the nonvolatile memory and configured to control the nonvolatile memory, wherein the controller is configured to execute processing of moving data stored in at least one block of the nonvolatile memory to at least one block of the other blocks of the nonvolatile memory, after determining that the total number of processes notified by the computer exceeds a first threshold value.

10. The computer system of claim 9, wherein each of the blocks of the nonvolatile memory is selectively used as any one of plural types of blocks different in degree of multi-level indicative of the number of bits stored in one memory cell, and the controller is configured to execute processing of moving data stored in a block having a low degree of multi-level to a block having a higher degree of multi-level, after determining that the total number of processes exceeds the first threshold value.

11. The computer system of claim 9, wherein the processor is configured to transmit to the storage device (i) information indicative of an identifier of each of the processes created in the computer and a type indicating whether each of the created processes is a system or a user process, and (ii) write requests to which identifiers of processes requesting data write are assigned respectively, and the controller is configured to:

manage correspondence between the identifier of each of the created processes, the type of each of the created processes, and an address range corresponding to data written by each of the created processes, by using a first management table; and select data written to the nonvolatile memory by the process whose type is the user process, as moving target data, in preference to data written to the nonvolatile memory by the process whose type is the user process, and move the moving target data from a block where the moving target data is stored to another block, based on the first management table, after determining that the total number of processes exceeds the first threshold value.

12. The computer system of claim 11, wherein each of the blocks of the nonvolatile memory is selectively used as any one of plural types of blocks different in degree of multi-level indicative of the number of bits stored in one memory cell, and the controller is configured to execute processing of moving data from a block having a low degree of multi-level to a block having a higher degree of multi-level.

13. The storage device of claim 9, wherein the processor is configured to notify the storage device of a usage of the memory of the computer, the usage of the memory of the computer being obtained by the processor, the usage of the memory of the computer indicating (i) a total usage of the memory of the computer or (ii) a rate of the total usage of the memory of the computer to a total memory size of the memory of the host, and the controller is configured to execute processing of moving data stored in at least one block of the nonvolatile memory to at least one block of the other blocks of the nonvolatile memory, after determining that the usage of the memory of the host exceeds the third threshold value.

14. The computer system of claim 13, wherein the processor is configured to estimate a data amount written to the storage device by swap out of a process which occurs next and notify the storage device of the data amount, the data amount corresponding an amount of data stored in a first memory region of the memory of the computer, the first memory region being a memory region allocated to a target process for the swap out; and the controller is configured to moving data stored in at least one block of the nonvolatile memory to at least one block of the other blocks of the nonvolatile memory so as to reserve free space corresponding to the notified data amount, after determining that the usage of the memory of the computer exceeds the third threshold value.

15. The computer system of claim 9, wherein the processor is configured to execute processing of notifying the storage device of an identifier of each of the processes created by the computer, processing of transmitting to the storage device read/write requests to which identifiers of processes requesting data read or data write are assigned respectively, and processing of notifying the storage device of a program of a high launch frequency, and the controller is configured to:

manage correspondence between the identifier of each of the created processes and an address range corresponding to data read or written by each of the created processes, by using a first management table; and execute processing of moving data read or written by a process corresponding to the program of a high launch frequency from a block having a high degree of multi-level to a block having a lower degree of multi-level, based on the first management table.

\* \* \* \* \*